United States Patent
Park et al.

(10) Patent No.: US 11,581,997 B2
(45) Date of Patent: Feb. 14, 2023

(54) METHOD AND DEVICE FOR TRANSMITTING PPDU ON BASIS OF FDR IN WIRELESS LAN SYSTEM

(71) Applicant: LG ELECTRONICS INC., Seoul (KR)

(72) Inventors: Eunsung Park, Seoul (KR); Jeongki Kim, Seoul (KR); Kiseon Ryu, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 17/042,881

(22) PCT Filed: Apr. 2, 2019

(86) PCT No.: PCT/KR2019/003829
§ 371 (c)(1),
(2) Date: Sep. 28, 2020

(87) PCT Pub. No.: WO2019/194516
PCT Pub. Date: Oct. 10, 2019

(65) Prior Publication Data
US 2021/0028897 A1    Jan. 28, 2021

(30) Foreign Application Priority Data

Apr. 6, 2018    (KR) .................. 10-2018-0040308
Apr. 12, 2018   (KR) .................. 10-2018-0042705

(51) Int. Cl.
*H04L 5/00*     (2006.01)
*H04L 5/14*     (2006.01)
*H04W 84/12*    (2009.01)

(52) U.S. Cl.
CPC .............. *H04L 5/0044* (2013.01); *H04L 5/14* (2013.01); *H04W 84/12* (2013.01)

(58) Field of Classification Search
CPC ......... H04W 84/12; H04L 5/0044; H04L 5/14
See application file for complete search history.

(56) References Cited

U.S. PATENT DOCUMENTS

2016/0105836 A1*  4/2016  Seok ............... H04B 7/0452
                                                          370/331
2016/0127108 A1   5/2016  Jindal et al.
(Continued)

FOREIGN PATENT DOCUMENTS

WO    2016/089059    6/2016
WO    2017/030342    2/2017

OTHER PUBLICATIONS

PCT International Application No. PCT/KR2019/003829, International Search Report dated Jul. 9, 2019, 2 pages.

*Primary Examiner* — Kent Krueger
(74) *Attorney, Agent, or Firm* — Lee Hong Degerman Kang & Waimey

(57) ABSTRACT

A method and a device for transmitting and receiving PPDU on the basis of FDR in a wireless LAN system are presented. More particularly, an AP transmits a trigger frame to an STA. The AP transmits downlink (DL) PPDU to the STA on the basis of the AP trigger frame. The AP receives uplink (UL) PPDU from the STA on the basis of the trigger frame. The trigger frame includes a first common information field. The first common information field includes a trigger type field, a length field, and a bandwidth field. The length field comprises information on the length of the longest PPDU of the DL PPDU and the UL PPDU. The bandwidth field comprises information on the total bandwidth over which the DL PPDU and the UL PPDU are transmitted. The DL (Continued)

PPDU and the UL PPDU are transmitted and received on the basis of FDR.

18 Claims, 30 Drawing Sheets

(56) References Cited

U.S. PATENT DOCUMENTS

| | | | |
|---|---|---|---|
| 2017/0257859 A1* | 9/2017 | Li | H04W 52/146 |
| 2018/0084548 A1 | 3/2018 | Min et al. | |
| 2018/0091284 A1 | 3/2018 | Min et al. | |
| 2018/0167929 A9* | 6/2018 | Chu | H04L 5/0007 |
| 2019/0021025 A1* | 1/2019 | Ahn | H04W 28/06 |
| 2019/0124556 A1* | 4/2019 | Verma | H04W 88/10 |
| 2019/0364577 A1* | 11/2019 | Hedayat | H04L 27/2613 |
| 2020/0322105 A1* | 10/2020 | Chitrakar | H04B 7/0452 |

* cited by examiner

FIG. 1
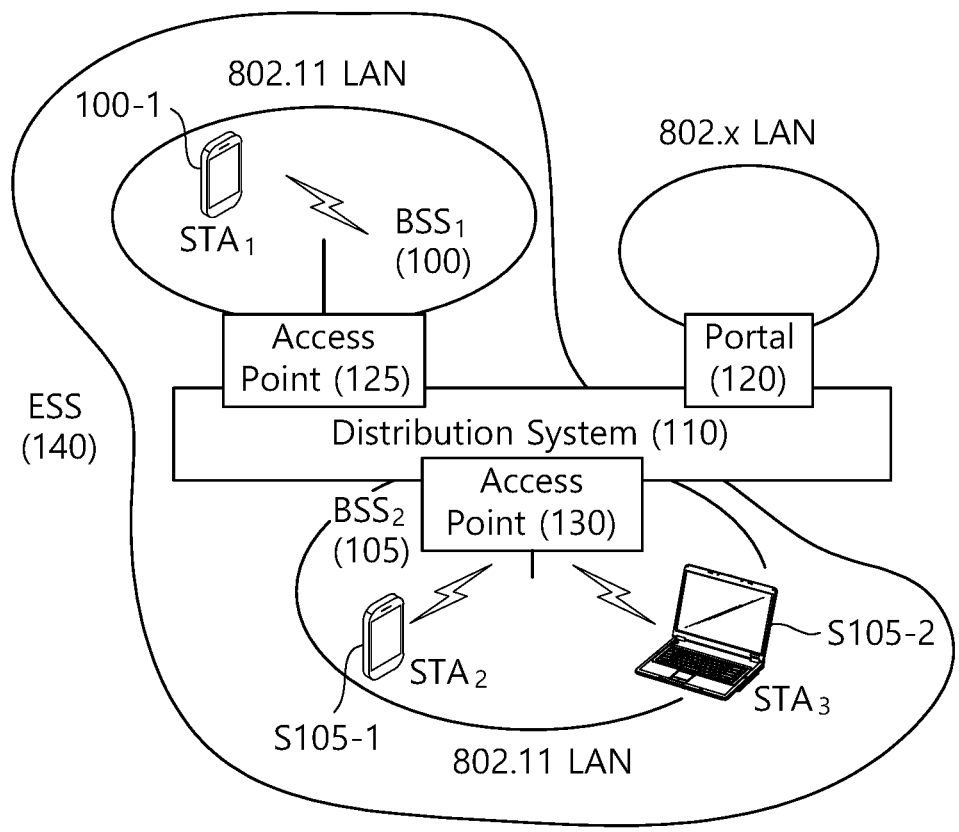
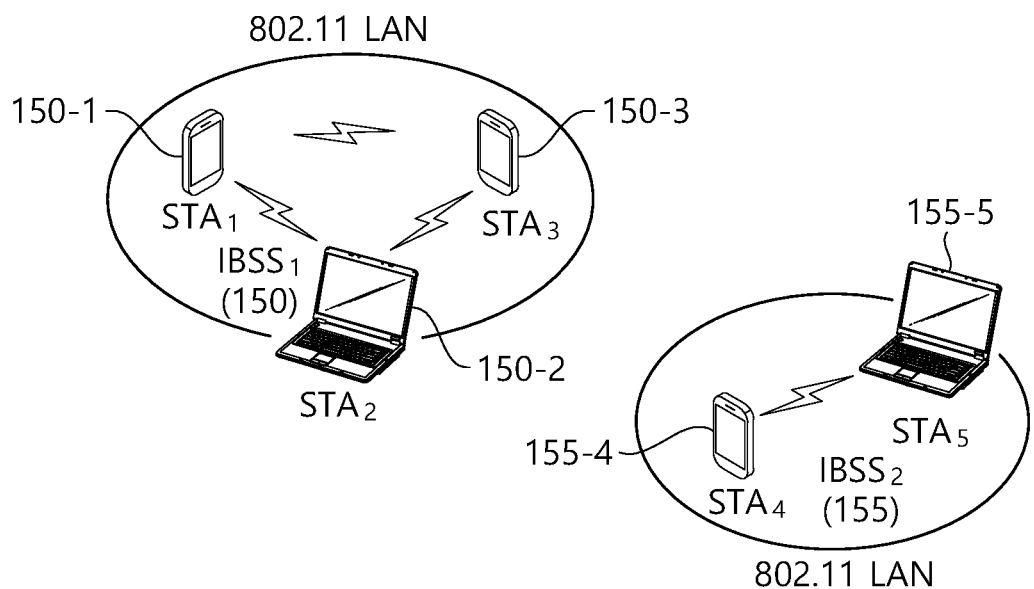

Self-interference is millions to billions(60-90dB) stronger than received signal

FIG. 23

| | | | | | | | | |
|---|---|---|---|---|---|---|---|---|
| Primary 40MHz | L-STF | L-LTF | L-SIG | RL-SIG | FDR-SIG-A | FDR-SIG-B | FDR-STF | FDR-LTF | DATA |
| Secondary 20MHz | L-STF | L-LTF | L-SIG | RL-SIG | FDR-SIG-A | FDR-SIG-B | FDR-STF | FDR-LTF | DATA |
| Secondary 40MHz | L-STF | L-LTF | L-SIG | RL-SIG | FDR-SIG-A | FDR-SIG-B | FDR-STF | FDR-LTF | DATA |

METHOD AND DEVICE FOR TRANSMITTING PPDU ON BASIS OF FDR IN WIRELESS LAN SYSTEM

CROSS-REFERENCE TO RELATED APPLICATIONS

This application is the National Stage filing under 35 U.S.C. 371 of International Application No. PCT/KR2019/003829, filed on Apr. 2, 2019, which claims the benefit of earlier filing date and right of priority to Korean Application Nos. 10-2018-0040308, filed on Apr. 6, 2018, and 10-2018-0042705, filed on Apr. 12, 2018, the contents of which are all hereby incorporated by reference herein in their entirety.

BACKGROUND

Field

The present disclosure relates to a technique for performing FDR in a WLAN system and more specifically, a method and a device for transmitting a PPDU using an FDR scheme in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device transmitting a PPDU based on Full-Duplex Radio (FDR) in a WLAN system.

One embodiment of the present disclosure proposes a method for transmitting and receiving a PPDU based on Full-Duplex Radio (FDR).

The present embodiment may be performed in a network environment in which the next-generation WLAN system is supported. The next-generation WLAN system is a WLAN system that improves the 802.11ax system and may satisfy backward compatibility with the 802.11ax system.

To summarize the terms, an HE MU PPDU, an HE TB PPDU, an HE-SIG-A field, and an HE-SIG-B field may all be PPDUs and fields defined in the 802.11ax system. An FDR MU PPDU, an FDR TB PPDU, an FDR-SIG-A field, and an FDR-SIG-B field may be PPDUs and fields defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The present embodiment may be performed in a transmitting device, and the transmitting device may correspond to an access point (AP). A receiving device may correspond to a station (STA) (non AP STA) having FDR capability. In addition, the present embodiment may include both a symmetric FDR operation and an asymmetric FDR operation.

The AP transmits a trigger frame to the STA.

The AP transmits a downlink (DL) PPDU to the STA, based on the trigger frame. The DL PPDU may be generated by using a high efficiency multi user PPDU (HE MU PPDU). That is, the DL PPDU may be an FDR MU PPDU generated by reusing the HE MU PPDU.

The AP receives an uplink (UL) PPDU from the STA, based on the trigger frame. The UL PPDU may be generated by using a high efficiency trigger-based PPDU (HE TB PPDU). That is, the UL PPDU may be an FDR TB PPDU generated by using the HE TB PPDU. In this case, the DL PPDU and the UL PPDU are transmitted/received based on the FDR.

The present embodiment proposes a method of signaling control information for DL transmission and UL transmission simultaneously by using the trigger frame. The trigger frame proposed in the present embodiment may be defined as follows.

The trigger frame includes a first common information field.

The first common information field includes a trigger type field, a length field, and a bandwidth field. The first common information field may be a field in which control information of the DL and UL PPDUs is generated simultaneously.

The length field includes information on a length of a longest PPDU among the DL and UL PPDUs. The bandwidth field includes information on a total bandwidth at which the DL and UL PPDUs are transmitted.

The trigger frame may further include a second common information field for the DL PPDU and a third common information field for the UL PPDU. In this case, the second and third common information fields may not include the trigger type field, the length field, and the bandwidth field. This is because there is no need to redundantly insert a field included in the first common information field.

The trigger frame may further include a first user information field for the DL PPDU and a second user information field for the UL PPDU.

The first user information field may include allocation information of a first resource unit (RU) in which the DL PPDU is transmitted. The second user information field may include allocation information of a second RU in which the UL PPDU is transmitted. That is, the DL PPDU and the UL PPDU are transmitted and received simultaneously based on FDR in such a manner that the DL PPDU is transmitted in the first RU and the UL PPDU is transmitted in the second RU. Accordingly, the DL PPDU and the UL PPDU are completely divided in frequency (completely divided into the first RU and the second RU) to reduce an influence of interference based on FDR.

A first signal field included in the DL PPDU may include a first bandwidth field. The first bandwidth field may include information on a bandwidth at which the DL PPDU is transmitted.

A second signal field included in the UL PPDU may include a second bandwidth field. The second bandwidth field may include information on a bandwidth at which the UL PPDU is transmitted.

A bandwidth at which the UL PPDU is transmitted may be 20 MHz. In this case, the first RU may be determined based on a tone plan for the total bandwidth. The second RU may be determined based on a tone plan for 20 MHz.

The aforementioned tone plan may be a tone plan defined in 802.11ax. For example, it is assumed that the total bandwidth is 40 MHz, the DL PPDU is transmitted at primary 20 MHz, and the UL PPDU is transmitted at secondary 20 MHz. In this case, the first RU in which the DL PPDU is transmitted may be determined by using a tone plan for 40 MHz, and the second RU in which the UL PPDU is transmitted may be determined by using a tone plan for 20 MHz.

The first user information field may include information on whether the STA receives the DL PPDU. The second user information field may include information on whether the STA transmits the UL PPDU. That is, whether the STA performs DL transmission or performs UL transmission may be known through the information.

Information on the total bandwidth may consist of 2 bits. The total bandwidth may be determined to one of 20 MHz, 40 MHz, 80 MHz, and 160(80+80)MHz, based on the 2 bits.

The trigger type field may include FDR indication information on that the STA can perform the FDR. The FDR indication information may be included in a reserved bit of the trigger type field.

The DL PPDU may be generated by using a high efficiency multi user PPDU (HE MU PPDU). The UL PPDU may be generated by using a high efficiency trigger-based PPDU (HE TB PPDU).

The first signal field may be related to an HE-SIG-A field of the HE MU PPDU. The second signal field may be related to an HE-SIG-A field of the HE TB PPDU.

The DL PPDU may not include an HE-SIG-B field of the HE MU PPDU. This is because allocation information of the DL PPDU and UL PPDU is signaled through a first user information field and second user information field in the trigger frame.

The first and second bandwidth fields may be configured to be identical to the bandwidth field included in the first common information field. That is, a bandwidth (BW) field of FDR-SIG-A of the FDR MU PPDU and FDR TB PPDU may be configured to be identical to the BW field of the trigger frame.

The present disclosure proposes a method for transmitting and receiving a PPDU based on FDR in a WLAN system.

According to an embodiment proposed in the present disclosure, since DL transmission and UL transmission can be simultaneously supported by using a trigger frame, RU allocation can be prevented from being scheduled twice in the trigger frame and a DL PPDU. Therefore, an overhead of the DL PPDU can be decreased, thereby obtaining a high throughput.

BRIEF DESCRIPTION OF THE DRAWINGS

FIG. 1 is a conceptual view illustrating the structure of a wireless local area network (WLAN).

FIG. 23 illustrates an example of an OFDMA-based FDR MU PPDU.

DESCRIPTION OF EXEMPLARY EMBODIMENTS

Figure 2:
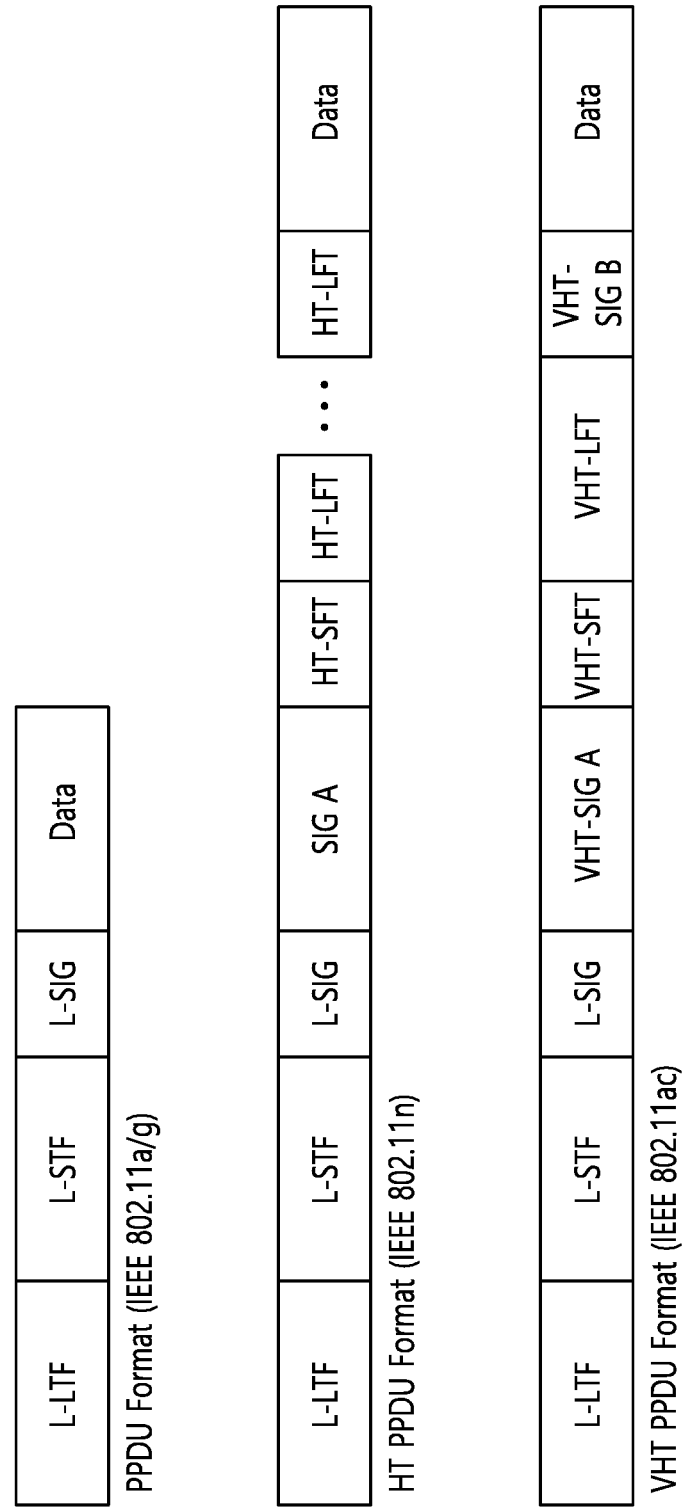
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centerized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
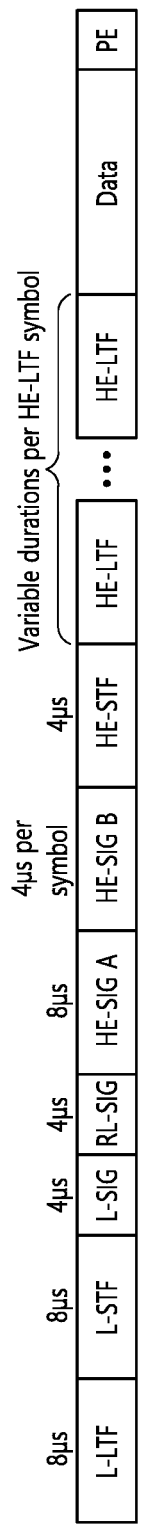
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
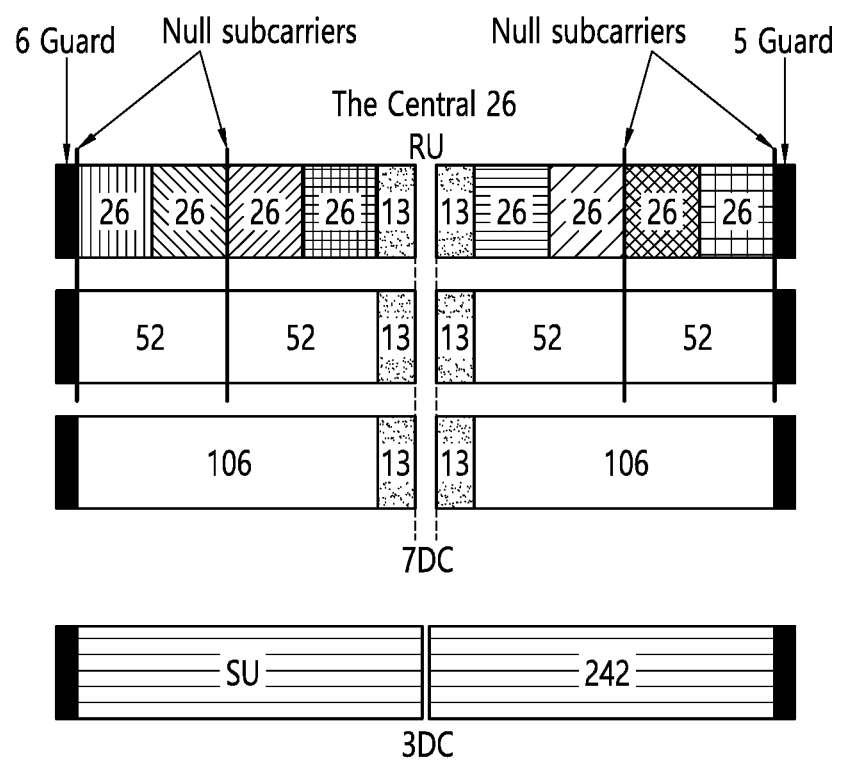
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
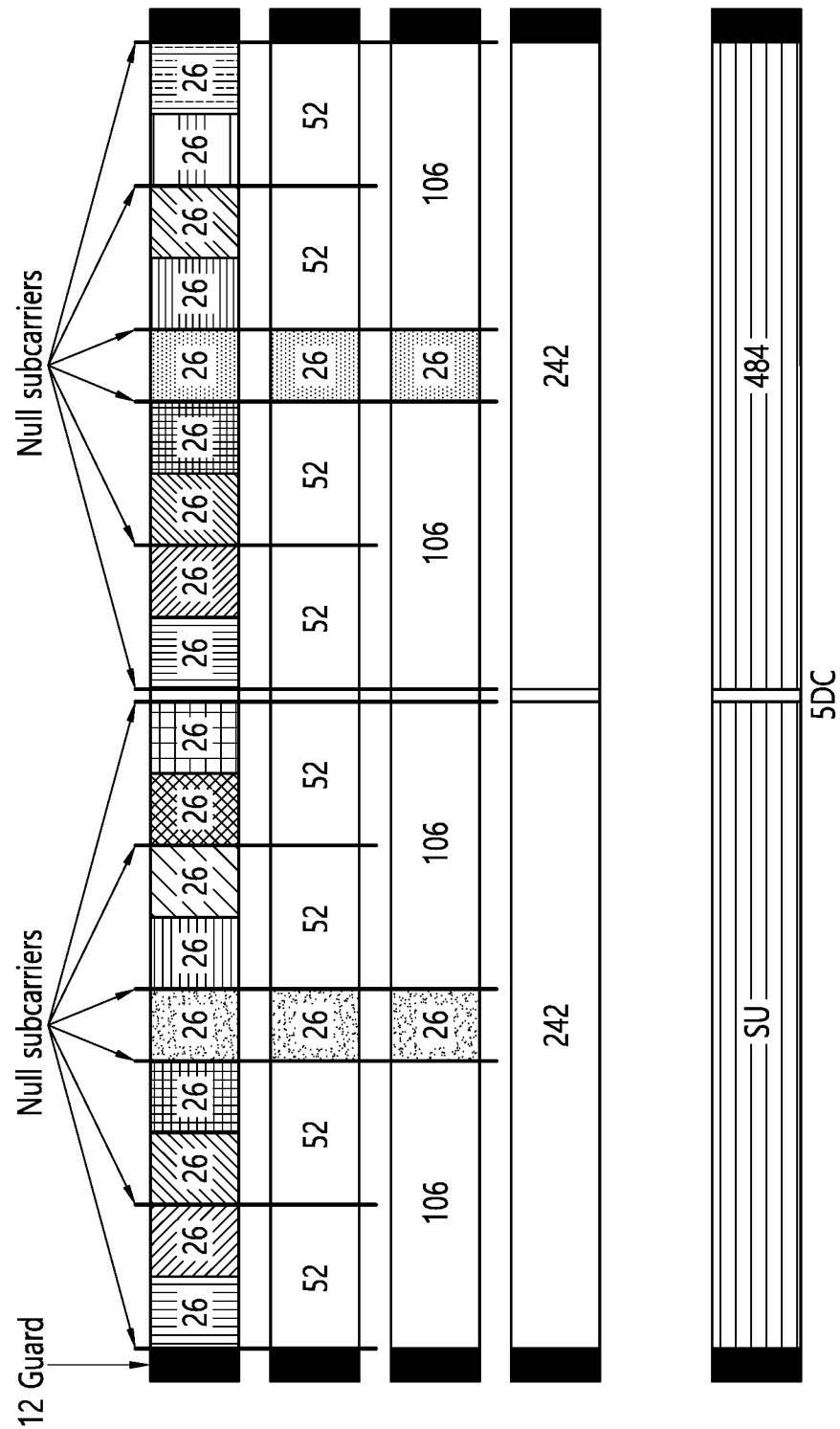
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
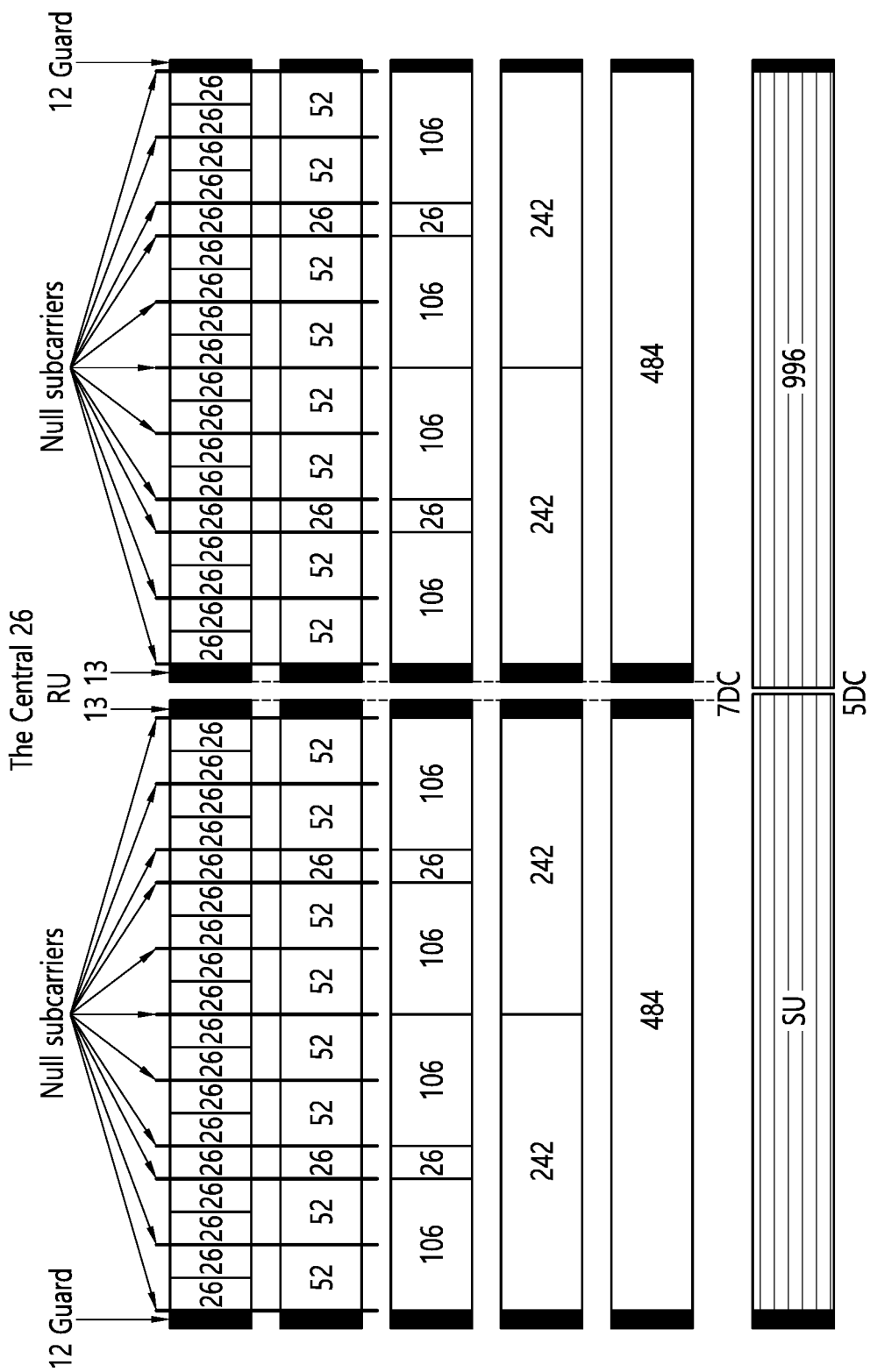
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
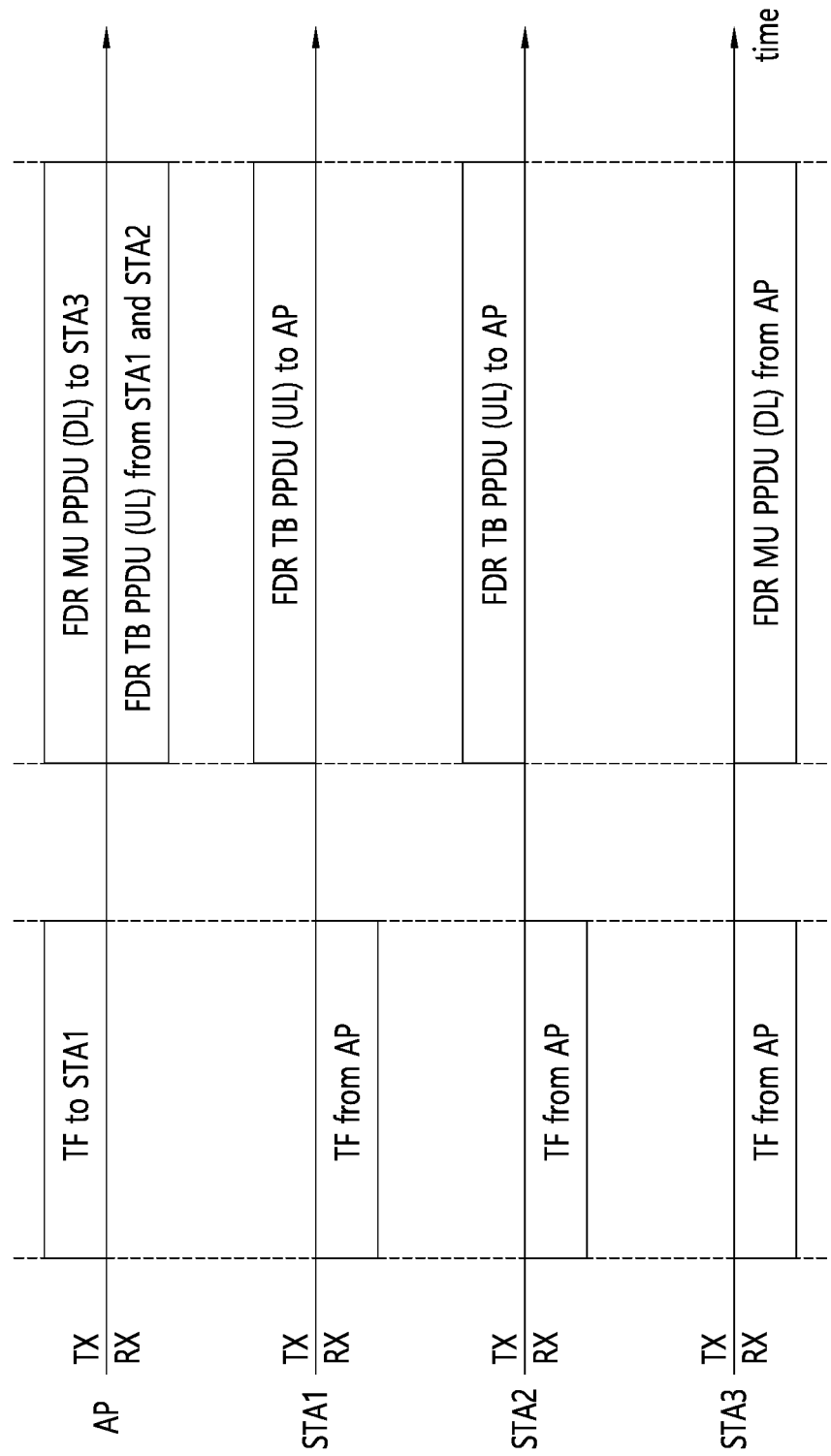
FIG. 26 illustrates a procedure according to which DL transmission and UL transmission are performed based on asymmetric FDR according to the present embodiment.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
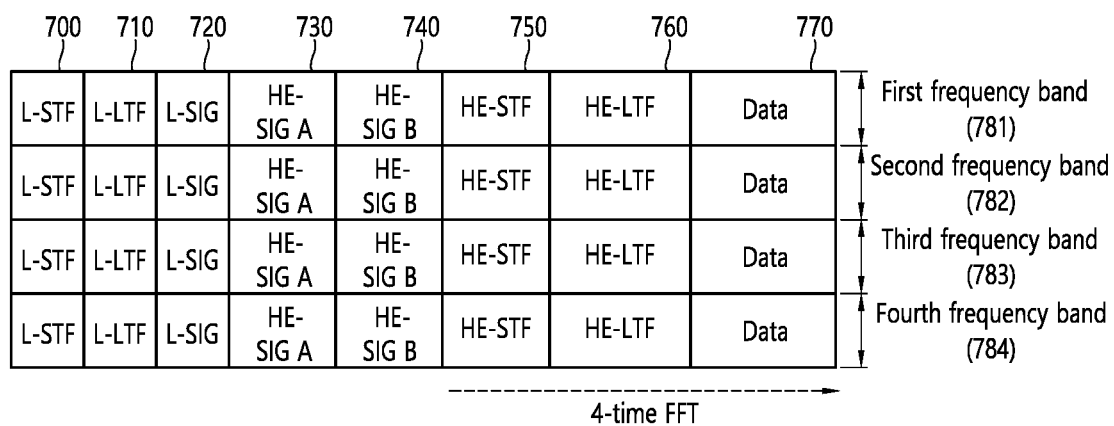
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
| --- | --- | --- | --- | --- |
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK_FLAG. |

TABLE 1-continued

| Two Parts of HE-SIG-A | Bit | Field | Number of bits | Description |
|---|---|---|---|---|
| | B3-B6 | MCS | 4 | For an HE SU PPDU:<br>Set to n for MCSn, where n = 0, 1, 2, . . . , 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 for MCS 0<br>Values 1-15 are reserved |
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if(#15489) both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804).<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if(#Ed) both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams. Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the |

TABLE 1-continued

| Two Parts of HE-SIG-A | Bit | Field | Number of bits | Description |
|---|---|---|---|---|
| SU PPDU) | | | | TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION − 512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL.<br>Set to the value indicated by the TXVECTOR parameter UPLINK_FLAG. (#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2 |

TABLE 2-continued

| Two Parts of HE-SIG-A | Bit | Field | Number of bits | Description |
|---|---|---|---|---|
| | | | | Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz subchannels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0;<br>Set to 15 to indicate that the number of OFDM symbols in the HE-SIG-B field is greater than or equal to 16 if the Longer than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present.<br>Set to 1 if the Common field in HE-SIG-B is not present. (#16139) |
| | B23-B24 | GI + LTF Size | 2 | Indicates the GI duration and HE-LTF size:<br>Set to 0 to indicate a 4x HE-LTF and 0.8 μs GI<br>Set to 1 to indicate a 2x HE-LTF and 0.8 μs GI |

TABLE 2-continued

| Two Parts of HE-SIG-A | Bit | Field | Number of bits | Description |
|---|---|---|---|---|
| | | | | Set to 2 to indicate a 2x HE-LTF and 1.6 μs GI<br>Set to 3 to indicate a 4x HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION − 512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. (#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz sub-band of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TX VECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is |

TABLE 3-continued

| Two Parts of HE-SIG-A | Bit | Field | Number of bits | Description |
|---|---|---|---|---|
| | | | | 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If(#Ed) the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz Set to 1 for 40 MHz Set to 2 for 80 MHz Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION − 512)/128)(#16277). where(#16061) B0 indicates the TXOP length granularity. Set to 0 for 8 µs: otherwise set to 1 for 128 µs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |

TABLE 3-continued

| Two Parts of HE-SIG-A | Bit | Field | Number of bits | Description |
|---|---|---|---|---|
| | B20-B25 | Tail | 6 | Used to terminate the trellis of the convolutional decoder. Set to 0. |

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
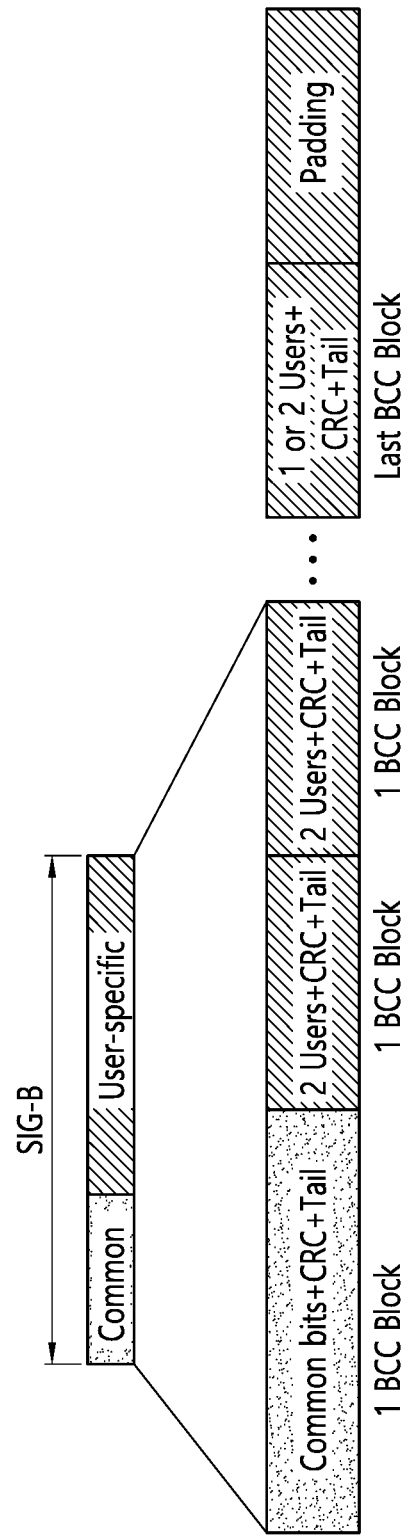
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 ns). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
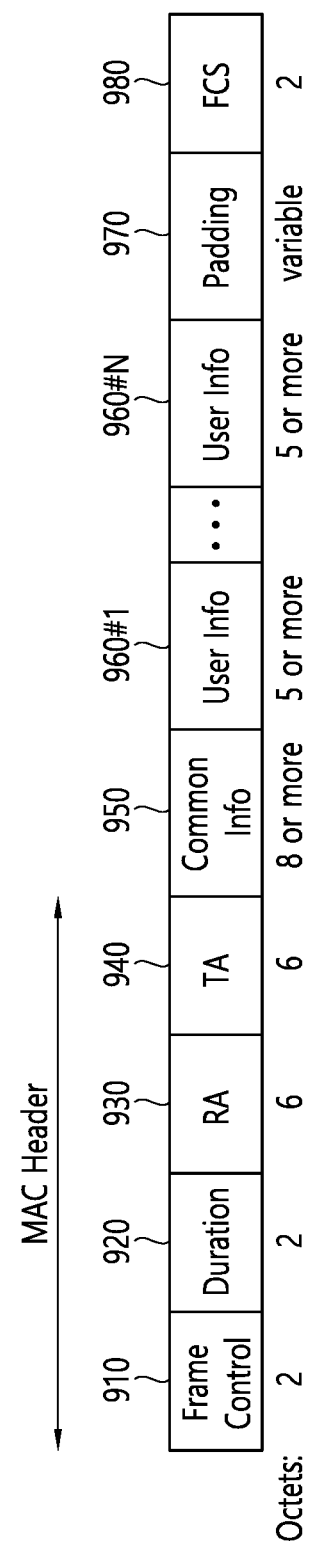
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Also, the RA field 930 includes address information of a receiving STA of the corresponding trigger frame and may be omitted if necessary. The TA field 940 includes address information of an STA triggering the corresponding trigger frame (for example, an AP), and the common information field 950 includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field 970 and a frame check sequence field 980.

It is preferable that each of the per user information fields (960 #1 to 960 #N) shown in FIG. 9 includes a plurality of subfields.

Figure 10:
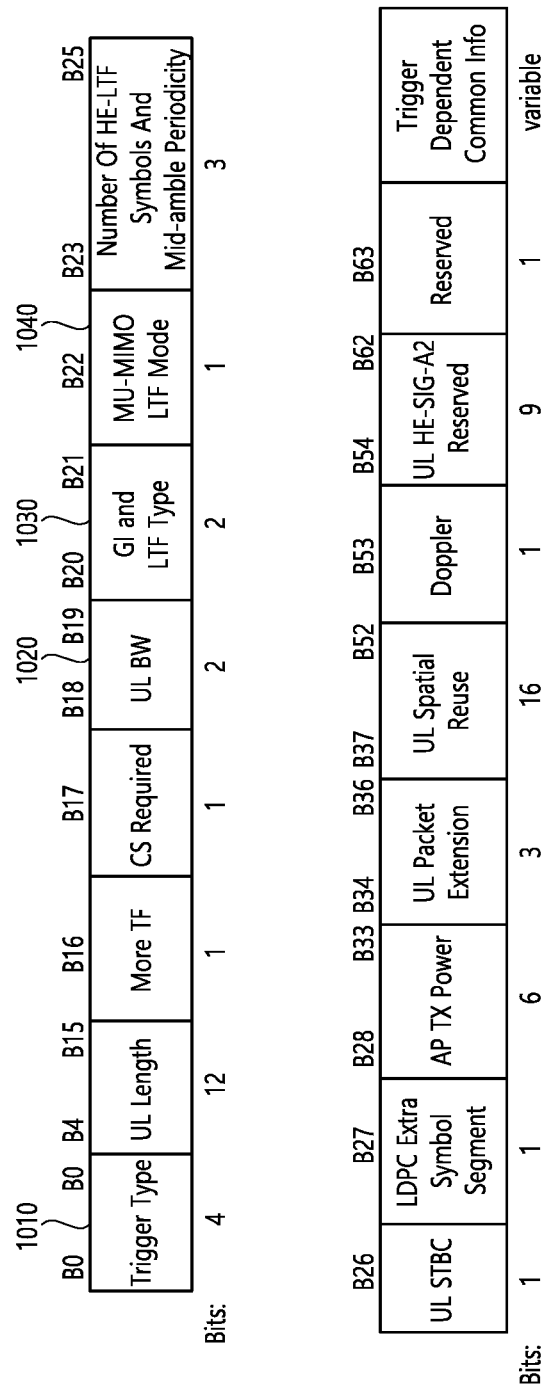
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

The trigger type field 1010 of FIG. 10 may indicate a trigger frame variant and encoding of the trigger frame variant. The trigger type field 1010 may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field 1020 of FIG. 10 indicates bandwidth in the HE-SIG-A field of an HE Trigger Based (TB) PPDU. The UL BW field 1020 may be defined as follows.

TABLE 5

| UL BW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields 1030 of FIG. 10 indicate the GI and HE-LTF type of the HE TB PPDU response. The GI and LTF type field 1030 may be defined as follows.

TABLE 6

| GI And LTF field value | Description |
| --- | --- |
| 0 | 1x HE-LTF + 1.6 µs GI |
| 1 | 2x HE-LTF + 1.6 µs GI |
| 2 | 4x HE- LTF + 3.2 µs GI(#15968) |
| 3 | Reserved |

Also, when the GI and LTF type fields 1030 have a value of 2 or 3, the MU-MIMO LTF mode field 1040 of FIG. 10 indicates the LTF mode of a UL MU-MIMO HE TB PPDU response. At this time, the MU-MIMO LTF mode field 1040 may be defined as follows.

If the trigger frame allocates an RU that occupies the whole HE TB PPDU bandwidth and the RU is allocated to one or more STAs, the MU-MIMO LTF mode field 1040 indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field 1040 indicates the HE single stream pilot HE-LTF mode. The MU-MIMO LTF mode field 1040 may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
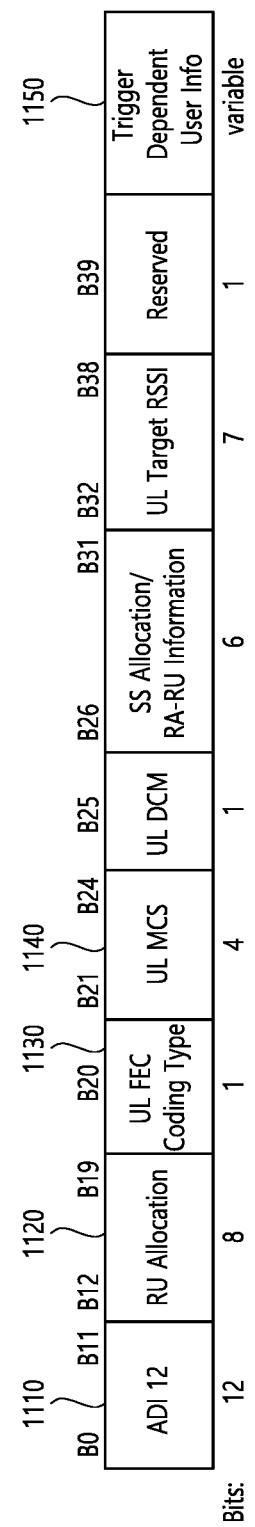
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field 1120 may be included. In other words, when a receiving STA identified by the User Identifier field 1110 transmits a UL PPDU in response to the trigger frame of FIG. 9, the corresponding UL PPDU is transmitted through an RU indicated by the RU Allocation field 1120. In this case, it is preferable that the RU indicated by the RU Allocation field 1120 corresponds to the RUs shown in FIGS. 4, 5, and 6. A specific structure of the RU Allocation field 1120 will be described later.

The subfield of FIG. 11 may include a (UL FEC) coding type field 1130. The coding type field 1130 may indicate the coding type of an uplink PPDU transmitted in response to the trigger frame of FIG. 9. For example, when BCC coding is applied to the uplink PPDU, the coding type field 1130 may be set to '1', and when LDPC coding is applied, the coding type field 1130 may be set to '0'.

Additionally, the sub-field of FIG. 11 may include a UL MCS field 1140. The MCS field 1140 may indicate a MCS scheme being applied to the uplink PPDU that is transmitted in response to the trigger frame of FIG. 9.

Also, the subfield of FIG. 11 may include a Trigger Dependent User Info field 1150. When the Trigger Type field 1010 of FIG. 10 indicates a basic trigger variant, the Trigger Dependent User Info field 1150 may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates |

TABLE 8-continued

| Subfield | Number of bits | Description |
|---|---|---|
| | | the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1. If the Bandwidth field of the HE-SIG-A field in an HE MU PPDU is set to 2, 4 or 5 for 80 MHz: Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels. If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | 52 | | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | 52 | | — | 52 | | 52 | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | | | | 26 | | | 106 | | 64 |
| 11000$y_2y_1y_0$ | | | | 242 | | | | | | 8 |
| 11001$y_2y_1y_0$ | | | | 484 | | | | | | 8 |
| 11010$y_2y_1y_0$ | | | | 996 | | | | | | 8 |
| 11011$y_2y_1y_0$ | Reserved | | | | | | | | | 8 |
| 111$x_4x_3x_2x_1x_0$ | Reserved | | | | | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.

$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.

Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.

Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.

1 to #9 (from left to the right) is ordered in increasing order of the absolute frequency.

$x_1x_0$ = 00-11, $x_4x_3x_2x_1x_0$ = 00000-11111.

'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
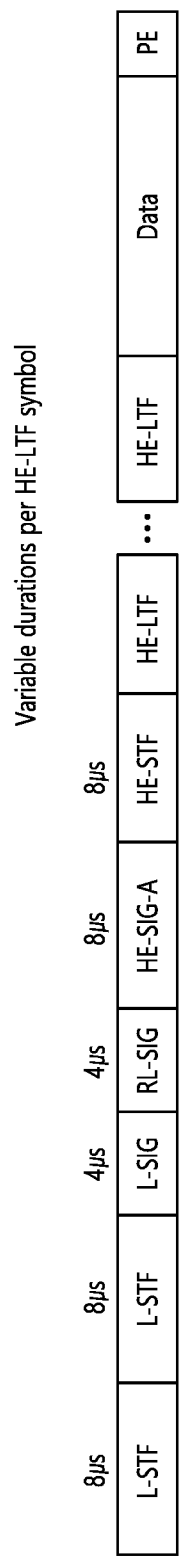
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit an HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Basic Concept of STR

In what follows, Simultaneous Transmit and Receive (STR) will be described.

Figure 13:
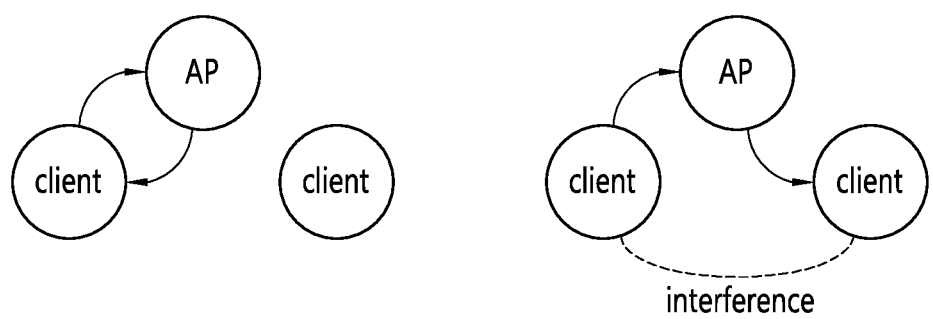
FIG. 13 illustrates types of STRs.

FIG. 13 illustrates types of STRs.

In-band STR is a technique that allows simultaneous transmission and reception in the same frequency band and also called Full-Duplex Radio (FDR). As shown in FIG. 13, in-band STR may be performed such that an AP and an STA form a pair to perform transmission and reception simultaneously with each other (see the left-side of the figure), or STAs perform only transmission or reception while the AP performs transmission and reception simultaneously (see the right-side of the figure). In the latter case (the right-side of FIG. 13), interference may occur between clients, and thus an additional interference cancellation technique may be needed.

Figure 14:
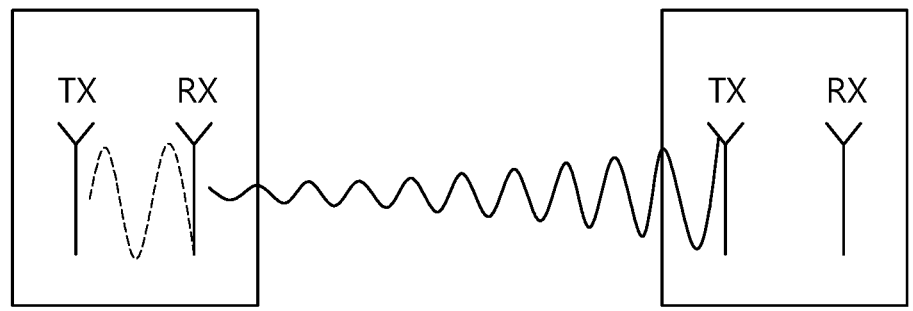
FIG. 14 illustrates an example in which a device performing STR generates self-interference.

FIG. 14 illustrates an example in which a device performing STR generates self-interference.

Referring to FIG. 14, when a wireless device performs STR, since a TX and RX antennas are adjacent to each other inside the wireless device, a transmission signal of the wireless device may interfere with a signal being received by the wireless device. Therefore, self-interference cancellation is required, for which various methods as shown in the following references may be applied.

TABLE 11

| Reference | Band | Bandwidth | # Antenna | # RF | Cancellation ||| Total |
|---|---|---|---|---|---|---|---|---|
| | | | | | Antenna | Analog | Digital | |
| MSR [8] | 530 MHz | | 2 | 2 | 25~30 dB | 30 dB | | 55~60 dB |
| Rice [9] | 2.4 GHz | 625 KHz | 2 | 3 | 39~45 dB | 31~33 dB | | 78~80 dB |
| Stanford [10] | 2.4 GHz | 5 MHz 802.15.4 | 3 | 2 | 30 dB | 20 dB | 10 dB | 60 dB |
| Stanford [4] | 2.4 GHz | 10 MHz 802.11n | 2 | 2 | | 45 dB | 28 dB | 73 dB |
| Stanford [7] | 2.4 GHz | 80 MHz 802.11ax | 1 | 2 | | 60 dB | 50 dB | 110 dB |
| NEC [11] | 5 GHz | 10 MHz WiMAX | 4 | 2 | 10(polar) + 45 dB | | 20 dB | 75 dB |
| Princeton [12] | 2.4 GHz | 625 KHz | 2M + 2N | M + N | 37 dB | | | |
| NYU [13] | 914 MHz | 26 MHz | 1 | 2 | 40~45 dB | 14 dB | | 59 dB |

Assumption: In general, DL refers to transmission from an AP to an STA, and UL refers to transmission from an STA to an AP. However, since the present disclosure assumes DL/UL for the convenience of description, an AP may be interpreted as an AP, a Mesh, a Relay, or an STA; likewise, an STA may be interpreted as an AP, a Mesh, a Relay, or an STA. Also, since fields such as STF and LTF are not relevant to the description of the present disclosure, they are omitted.

The present disclosure proposes a method for applying STR in a WiFi system by an AP by initiating STR. Methods for initiating STR by an AP may be divided largely into two types. To initiate STR, an AP may include signal information for a UL frame within a DL frame (method 1-1) when the DL frame is transmitted or use a separate trigger frame (method 1-2).

1-1. Method of Including Signal Information for a UL Frame within a DL Frame

Figure 15:
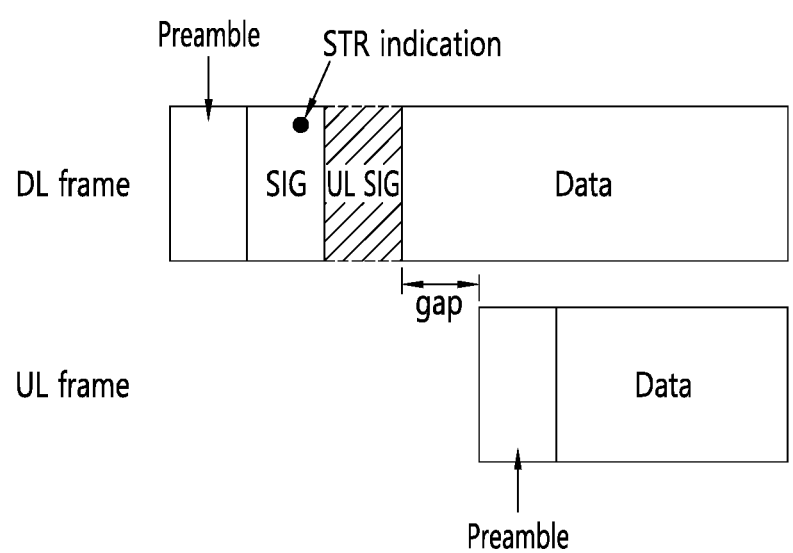
FIG. 15 illustrates an example of a DL/UL frame structure and transmission timing in the STR.

FIG. 15 illustrates an example of a DL/UL frame structure and transmission timing in the STR.

Regarding the first method, as shown in FIG. 15, to initiate STR, an AP may transmit a DL frame by including signal information for a UL frame within the DL frame. In this case, an STA has to transmit its UL frame after reading the information. At this time, since it takes time to generate a UL frame after the STA reads and decodes the signal information, the STA may transmit the UL frame only after a time period of 'gap' from the time the signal information is received. (The time period of 'gap' may be SIFS or DIFS, for example.)

The signal information for the UL frame (the UL SIG portion in FIG. 15) may be generated by newly adding a SIG field for the UL frame or by adding only the contents for UL frame allocation to the existing SIG field. However, an indication that the signal information has been included has to be placed before the UL SIG. If this is called STR indication, this indication may be added as a reserved bit of the existing SIG field or added as a new frame type. Or the indication may be defined as a new PHY structure. The UL SIG included in the SIG field should contain at least the ID of an STA to which a UL frame is transmitted. Or if a SIG field including the STA ID, such as the HE-SIG-B, is already included, the STA ID may be omitted. (if all the STAs receiving data of the DL frame transmit a UL frame through STR) in addition to the indication, information included in the existing SIG such as a TXOP value for UL transmission, RU allocation (if MU OFDMA is applied), frame length, MCS, or coding type may all be included. However, if TXOP, RU allocation, or frame length is to be matched to the DL frame, these values may be omitted; if MCS, coding type, and the like are subject to the determination made by an STA for transmission of the UL frame, these values may also be omitted. If all of the values may be omitted, an AP may trigger STR by using only the STR indication. If all of the values are needed, as an example of using the existing frame format, UL SIG information may be provided by inserting the HE-SIG-B after STR indication is handled by using a reserved bit (for example, B14) of the HE-SIG-A of the DL frame transmitted to the HE SU PPDU and the HE ER SU PPDU. In other words, in this case, the HE-SIG-B is transmitted to inform of configuration of the UL frame rather than the DL frame. As another example, to support STR by a DL frame transmitted to the HE MU PPDU, a reserved bit (for example, B7) of the HE-SIG-A field may be used for STR indication, and the HE-SIG field for the UL frame may be transmitted additionally after transmission of the HE-SIG-B for the DL frame. The UL SIG field may be similar to the HE-SIG-B but may not include any of the values that may be omitted.

Figure 16:
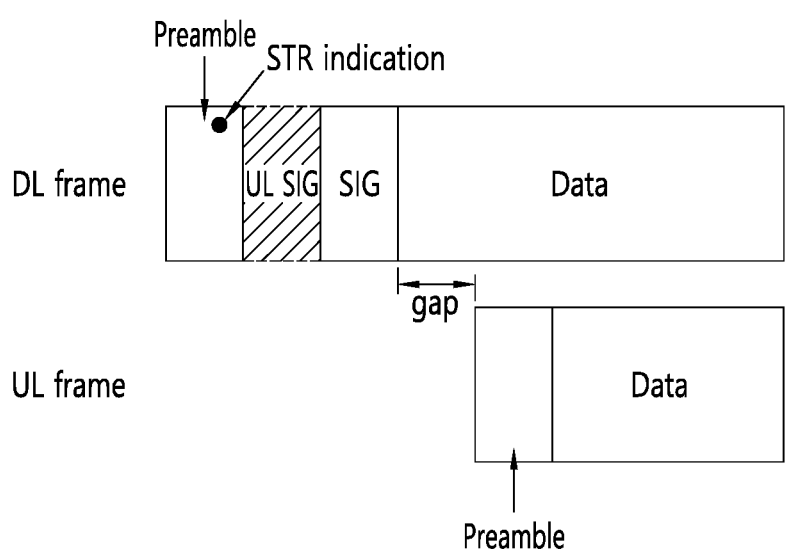
FIG. 16 illustrates another example of a DL/UL frame structure and transmission timing in the STR.

FIG. 16 illustrates another example of a DL/UL frame structure and transmission timing in the STR.

As another example, as shown in FIG. 16, for fast transmission of a UL frame, STR indication may be transmitted through a reserved bit of the L-SIG. In this case, the UL SIG field may be transmitted before the DL SIG field, and transmission of the UL frame may be initiated after a time period of 'gap' from the time the UL SIG field is received. At this time, since STAs have to check whether they are allocated to the STR, STA ID values have to be included in the UL SIG field. In addition, BSS ID (BSS color), RU allocation for configuration of the UL frame, BW, TXOP duration, UL PPDU length, MCS, and coding type may be included in the UL SIG field.

Now, a structure of the UL frame will be described.

Figure 17:
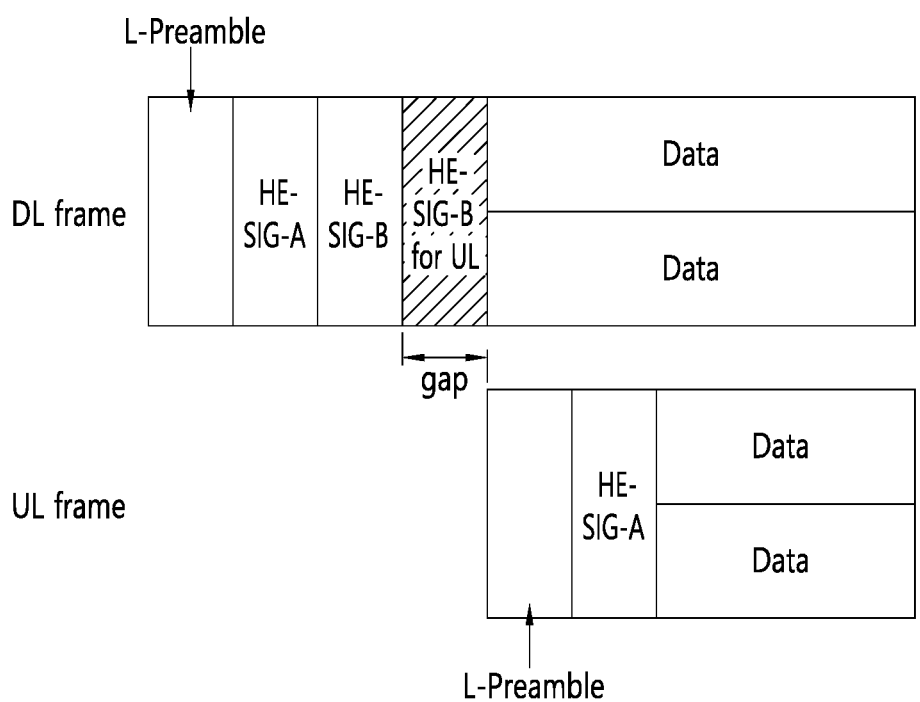
FIGS. 17 to 19 illustrate one example of a DL/UL frame structure and transmission timing for transmitting a UL frame in the STR.
Figure 18:
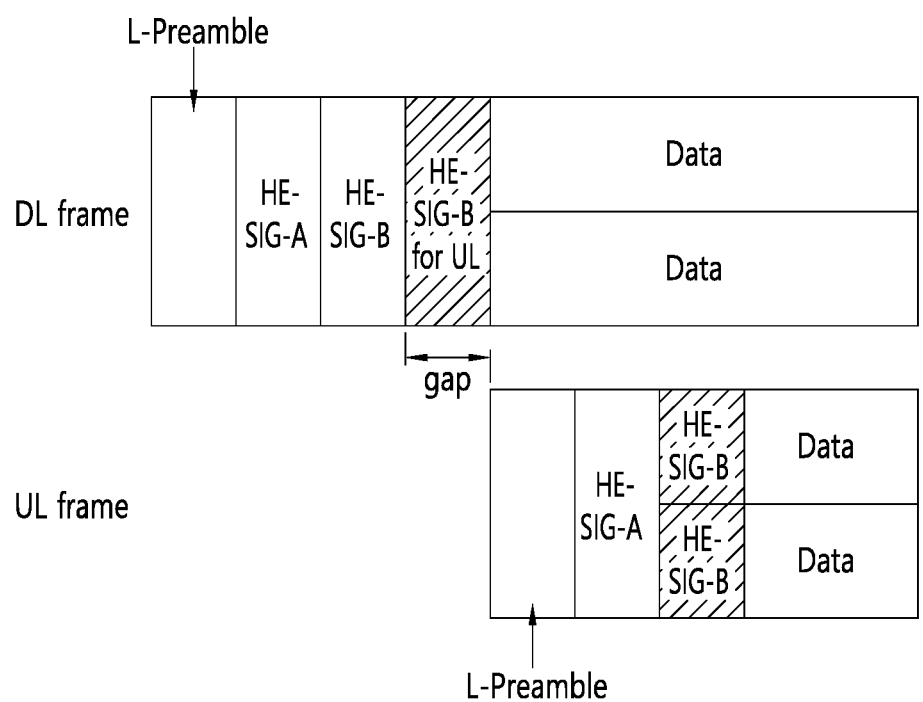
Figure 19:
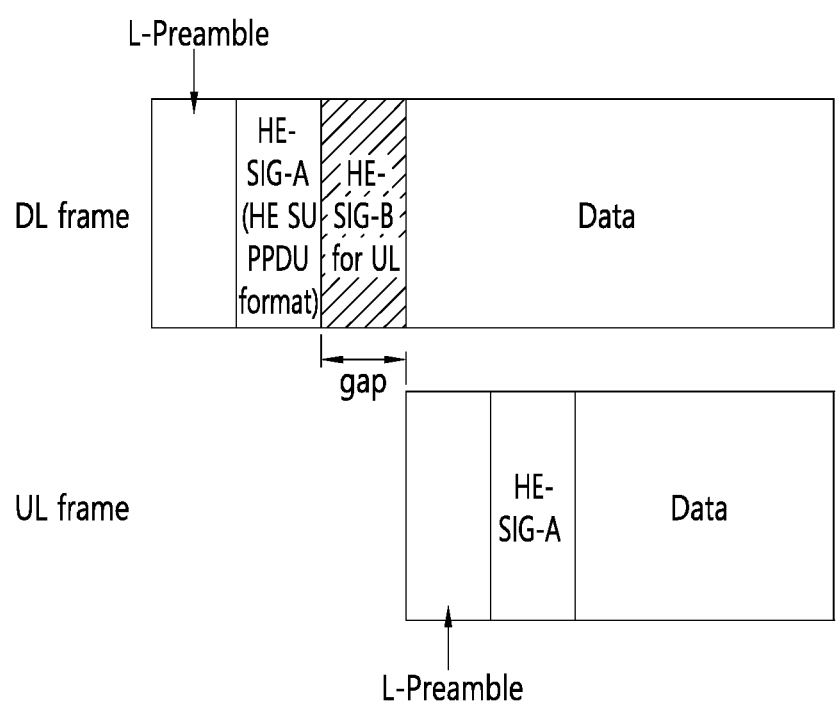

FIGS. 17 to 19 illustrate one example of a DL/UL frame structure and transmission timing for transmitting a UL frame in the STR.

A UL frame transmitted in the STR may include an L-preamble and a common SIG (HE-SIG-A in the case of 11ax format) for protection, decoding, and transmission time. At this time, the common SIG may include TXOP duration and UL frame length. At this time, the TXOP duration value may be obtained by subtracting a value measured from the L-preamble of a DL frame to the L-preamble of the UL frame from the TXOP duration included in a DL frame. Other specific UL SIG information may vary depending on the information on the UL SIG of the DL frame. In other words, if the DL frame specifies even the MCS and the coding type of the UL frame, no particular UL SIG information is necessary; for example, since the operation becomes similar to the UL MU procedure of the 11 ax (when an AP determines all of the structure of the UL frame), additional SIG information is not required. Therefore, in this case, the TB PPDU structure of the 11 ax may be used. Or if DL frame informs of only the ID of an STA to transmit the UL frame and RU allocation information (if a separate UL SIG or the same data as DL data are used to omit the other specific UL SIG information), since MCS, coding type, and so on should be informed to each STA before transmission of UL frame data, additional SIG information has to be transmitted before data transmission. If MU OFDMA transmission is performed while the 11 ax frame structure is being used, since a SIG structure in which transmission is performed according to RU allocation is not supported, it becomes a newly defined SIG structure. Or if the transmission is based on an SU structure rather than an MU structure, transmission may be handled by using the HE SU PPDU and the HE ER SU PPDU format (refer to the examples of FIGS. 17 to 19). Or even when a new STR UL frame structure is defined, a SIG structure is required, in which transmission is performed according to RU allocation after common SIG transmission. As described above, a newly defined SIG structure (the HE-SIG-B for UL of FIGS. 17 to 19) may include information such as MCS and coding type for data transmission for each STA.

1-2. Method of Using a Trigger Frame

Figure 20:
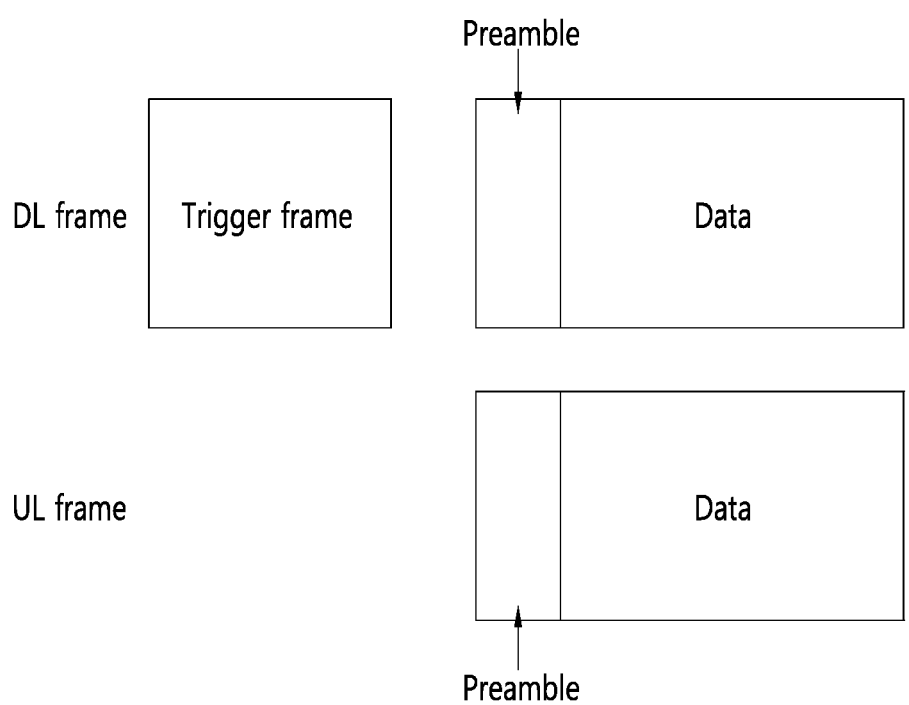
FIG. 20 illustrates one example of using a trigger frame to transmit a UL frame in the STR.

FIG. 20 illustrates one example of using a trigger frame to transmit a UL frame in the STR.

As a second method, as shown in FIG. 20, an AP may use a trigger frame separately for STR. At this time, unlike the UL MU procedure that uses a trigger frame of the existing 11ax, not only a UL frame but also a DL frame are transmitted after the trigger frame. (Or after the L-preamble of a DL frame is received or after up to the SIG information is received, the UL frame may be transmitted after a time period of 'gap') Therefore, in order to use the existing trigger frame, STR indication should be included. For example, STR may be added to the trigger frame type 1010. Or a Basic Trigger variant may be used for the trigger frame type, and a reserved bit (B5) of the Trigger Dependent User Info Field 1150 may be used for STR indication. When STR is applied to the MU OFDMA structure, it may be advantageous for interference cancellation and hidden node problems if RU allocations for DL and UL frames applied to one STR are the same and the frames end at the same timing. Therefore, in that case, SIG information such as an STA ID, RU allocation, TXOP duration, or frame length may be omitted when a DL frame following the trigger frame is transmitted.

For both cases above, the following rules may be applied.

(1) DL transmission and UL transmission may be synchronized to end at the same time to avoid a hidden node problem. Afterwards, if necessary, UL/DL Ack/BA frame may also be transmitted through STR.

(2) If MU OFDMA is used for STR, UL transmission may be performed by using RUs such as DL RUs allocated to each STA or by using part of the RUs. If part of the RUs are used, part of subcarriers at both ends of RUs to which a DL frame is allocated may be nulled for interference mitigation from packets of other STAs, after which a UL frame may be transmitted.

When the STR is applied as shown in FIGS. 15 to 20, an STA receiving a DL frame and an STA transmitting a UL frame may be different. In this case, STA ID and RU allocation information have to be included in each of the DL SIG and the UL SIG included in the DL STR frame. The remaining information may be configured as described above.

2. Proposed Embodiments

The present disclosure proposes a structure of an OFDMA-based FDR PPDU in the WLAN system (802.11).

The present disclosure proposes a method and a PPDU structure enabling UL or DL transmission by allocating a specific STA to an empty resource unit (RU) during DL or UL transmission using the 802.11 OFDMA structure (as shown in FIGS. 4 to 6). Various FDRs as shown below may be taken into consideration, and the present disclosure is based on a situation where DL transmission is performed first and a situation where UL transmission is performed first. In the FDR, first transmission is defined as primary transmission, and transmission performed later is defined as secondary transmission. The present disclosure assumes that in the case of secondary transmission, only one STA is allocated to a PPDU.

Also, the present disclosure may define an FDR PPDU based on a PPDU defined in the 802.11ax. In the embodiments as described below, an HE MU PPDU may correspond to the PPDU shown in FIG. 3, a trigger frame may correspond to the PPDU shown in FIG. 9, and an HE TB PPDU may correspond to the PPDU shown in FIG. 12. Also, the HE MU PPDU, HE SU PPDU, trigger frame, and fields (or subfield) included in the HE TB PPDU may also correspond to the fields (or subfields) of FIGS. 3 and 7 to 12.

Figure 21:
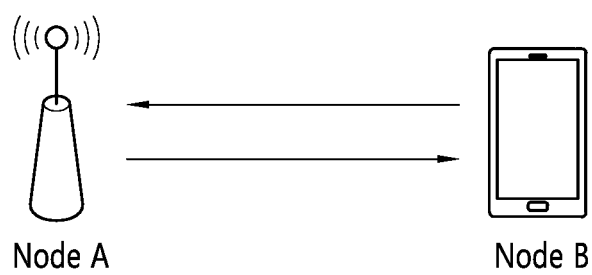
FIG. 21 illustrates an example of a symmetric FDR operation.
Figure 22:
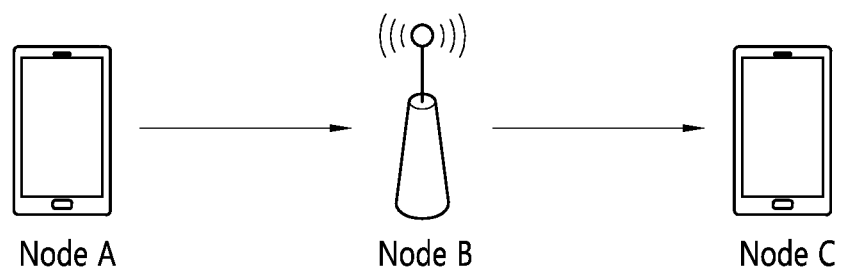
FIG. 22 illustrates an example of an asymmetric FDR operation.

FIG. 21 illustrates an example of a symmetric FDR operation. FIG. 22 illustrates an example of an asymmetric FDR operation.

Recently, Full-Duplex Radio (FDR), that is, a technique that enables a single transmitter and receiver to transmit and receive simultaneously, is actively researched. When FDR is employed, theoretical doubling of performance may be achieved in the MAC layer compared with the case when FDR is not employed, namely, a half-duplex scheme. However, one of major obstacles to implementing FDR is self-interference, that is, a signal transmitted by a specific STA is received back by the STA, interfering with the original signal to be received. Many studies have shown that cancellation performance more than 100 dB may be achieved at the current signal phase. If self-interference cancellation is successful in the PHY layer, a MAC protocol based on FDR operation is also required. FDR MAC is divided largely into two types: symmetric FDR and asymmetric FDR. FIGS. 8 and 9 illustrate examples of operations of the symmetric and the asymmetric FDR.

In the case of symmetric FDR, each transmission and reception occurs between two terminals. In other words, symmetric FDR is easier to implement than asymmetric FDR, but symmetric FDR exhibits a disadvantage that there should be data to be transmitted between exactly two terminals, which makes it difficult to be useful in real environments. On the other hand, in the case of asymmetric FDR, since two transmissions occur in pairs of different terminals, asymmetric FDR operation may occur with relatively more opportunities than the symmetric FDR; however, since transmission from node A to node B in FIG. 22 may cause inter-node interference to reception of node C, a terminal to perform FDR should be carefully selected.

Preamble puncturing is defined in 11ax, which means that, when an HE MU PPDU is transmitted using a wide bandwidth of 80 MHz or 160/80+80 MHz, it is transmitted by partially or entirely emptying a 20 MHz or 40 MHz channel. This transmission may be used when the 20 MHz or 40 MHz channel to be punctured is busy, and it is proposed a method in which preamble puncturing is used and applied to FDR when the channel is not busy but idle.

In 802.11ax, preamble puncturing is used in HE MU PPDU transmission, and signaling for this is achieved in a bandwidth field of HE-SIG-A1 (e.g., see the bandwidth field of Table 2 above).

Hereinafter, PPDU transmission in which a preamble is punctured will be described.

Preamble puncturing may be signaled by a bandwidth field of an HE-SIG-A field of an HE MU PPDU (see Table 2).

Specifically, a transmitting device transmits an HE MU PPDU together with the preamble puncturing at 80 MHz. In this case, if a primary 20 MHz channel and a secondary 40 MHz channel are idle during a PIFS interval immediately before TXOP starts, only secondary 20 MHz is punctured in a preamble (when a bandwidth field is set to 4).

In addition, the transmitting device transmits the HE MU PPDU together with the preamble puncturing at 80 MHz. In this case, if a primary 20 MHz channel, a secondary 20 MHz channel, and one of two 20 MHz sub-channels of a secondary 40 MHz are idle during a PIFS interval immediately before TXOP starts, only one of two 20 MHz sub-channels of the secondary 40 MHz is punctured in a preamble (when a bandwidth field is set to 5).

In addition, the transmitting device transmits the HE MU PPDU together with the preamble puncturing at 160 MHz or 80+80 MHz. In this case, if a primary 20 MHz channel, a secondary 20 MHz channel, and one of four 20 MHz sub-channels of a secondary 80 MHz are idle during a PIFS interval immediately before TXOP starts, only secondary 20 MHz is punctured in primary 80 MHz of a preamble (when a bandwidth field is set to 6).

In addition, the transmitting device transmits the HE MU PPDU together with the preamble puncturing at 160 MHz or 80+80 MHz. In this case, if a primary 20 MHz channel, a secondary 20 MHz channel, and one of four 20 MHz sub-channels of a secondary 80 MHz are idle during a PIFS interval immediately before TXOP starts, only primary 40 MHz is present in primary 80 MHz of a preamble (when a bandwidth field is set to 7).

It is optional for an HE STA to receive a preamble punctured HE PPDU having a bandwidth field in HE-SIG-A which is set to 4 to 7. It means that the HE STA can receive the preamble punctured HE PPDU having the bandwidth field in HE-SIG-A which is set to 4 to 7 by using a punctured preamble Rx subfield in an HE PHY capabilities information field of an HE capabilities field.

Preamble puncturing is used when a corresponding band is busy, as a concept in which an HE MU PPDU is transmitted by emptying a specific 20 MHz/40 MHz band.

The present disclosure proposes to use preamble puncturing in FDR transmission, which is for minimizing inter-STA interference and self-interference. That is, an 11ax preamble puncturing pattern is directly reused, and when a channel situation is idle in 80 MHz or 160/80+80 MHz transmission, a non-punctured part may be used in DL transmission, and a punctured part may be used in UL transmission, which may be applied to both symmetric and asymmetric FDRs of FIG. 21 and FIG. 22.

In FIG. 21, assuming that a node A is an AP, the AP may transmit a DL MU PPDU to a node B which is a non-AP STA through one format among several puncturing modes described above, and the node B may perform UL transmission to the AP by using a punctured channel. In this case, FDR is possible in both the AP and the non-AP STA.

In FIG. 22, it may be assumed that a node B is an AP. The AP may transmit a DL MU PPDU to a node C which is a non-AP STA through one format among several puncturing modes, and a node A which is another non-AP STA may perform UL transmission by using a punctured channel. In this case, FDR is possible only in the AP.

DL/UL transmission may be considered not only for a single STA but also multi-STAs. The DL MU PPDU may be transmitted to several STAs by using a channel of a non-punctured part. In addition, a UL PPDU may be transmitted from several STAs by using a punctured channel.

2-1. 11Ax Preamble Puncturing Pattern Reuse

A case of using a preamble puncturing pattern defined in the existing 11ax is considered first.

1) UL Indication Using Trigger Frame

In order to enable FDR in a preamble puncturing situation, an AP may determine which puncturing format will be used (scheduling for DL/UL is required), and may indicate UL transmission information to an STA through a trigger frame. In this case, the indication of DL transmission information is performed in an FDR DL PPDU. That is, the FDR DL PPDU may use an HE MU PPDU, and HE-SIGB for indicating DL transmission may be included in the FDR DL PPDU. The trigger frame may use an 11ax trigger frame. That is, a trigger frame of FIG. 9 may be used.

Herein, an FDR indication may be inserted to the trigger frame. This may be indicated by defining one of reserved elements in Trigger Type of a Common Info field to FDR. Alternatively, this may be indicated by defining a reserved bit B63 of the Common Info field to FDR. Table 4 above shows several variants of a trigger type subfield, and a value 8 may be defined to FDR.

FIG. 10 shows a configuration of a Common Info field.

Information on a punctured channel, that is, a bandwidth used in UL transmission, may be indicated in a BW subfield of the Common Info field of FIG. 10. If a puncturing pattern defined in 11ax at present is directly used, a bandwidth used in UL transmission of FDR is 20 MHz or 40 MHz. However, since this is not a bandwidth including primary 20 MHz, an indication is necessary to know to which type the 20/40 MHz corresponds. The 11ax punctured channel is secondary 20 MHz, or 20 MHz corresponding to primary 20 MHz in secondary 40 MHz, or 20 MHz corresponding to secondary 20 MHz in secondary 40 MHz, or secondary 40 MHz. Accordingly, a BW field may indicate 20 MHz or 40 MHz, and a 2-bit punctured channel field may be additionally defined so that each element is used to indicate four punctured channels. Alternatively, irrespective of a DL bandwidth, transmission shall be considered in UL only for the aforementioned four cases. Therefore, in order to minimize an overhead, in a trigger frame for FDR (i.e., with FDR indication), each element of the BW subfield may be mapped not to a bandwidth but to the aforementioned four punctured channels. An example of indicating the BW subfield is shown below in case of FDR.

00: Secondary 20 MHz,

01: 20 MHz corresponding to primary 20 MHz in secondary 40 MHz

10: 20 MHz corresponding to secondary 20 MHz in secondary 40 MHz

11: Secondary 40 MHz

Alternatively, the BW subfield may simply indicate 20/40/80/160/80+80 MHz. Anyway, since which RU will be used is indicated in a User Info field, there is no big problem even if a punctured pattern is not indicated. A bandwidth to be configured may be simply 20 MHz, or may be a total bandwidth used in DL/UL transmission.

The length subfield of the Common Info field of FIG. 10 may indicate a longest PPDU length by considering both DL/UL transmission.

2) DL/UL Transmission in UL Indication Using Trigger Frame

FIG. 23 illustrates an example of an OFDMA-based FDR MU PPDU.

Figure 24:
FIG. 24 illustrates an example of an OFDMA-based FDR UL PPDU.

FIG. 24 illustrates an example of an OFDMA-based FDR UL PPDU.

An FDR DL MU PPDU and an FDR UL PPDU may be transmitted simultaneously after a trigger frame is transmitted. The FDR DL MU PPDU may reuse an 11ax HE MU PPDU, and the FDR UL PPDU may reuse an 11ax HE TB PPDU. However, an FDR indication may be included in each PPDU, and an FDR DL MU PPDU may use a reserved 1 bit B4 between a rate field and length field of L-SIG or RL-SIG. Alternatively, a reserved bit B7 of HE-SIG-A2 may be used. Alternatively, a 1 bit FDR indication subfield may be defined in a common field of HE-SIG-B. The FDR UL PPDU may use the reserved 1 bit B4 between the rate field and length field of L-SIG or RL-SIG. Alternatively, an FDR indication subfield may be defined by using 1 bit in a reserved bit B23 of HE-SIG-A1 or reserved bits B7 to B15 of HE-SIG-A2. FIG. 23 shows a configuration of an FDR DL MU PPDU in a situation where a value of a bandwidth subfield of SIGA is set to 4, i.e., since 3 bits are set to '100'. In this case, an FDR UL PPDU of FIG. 24 may be transmitted by using secondary 20 MHz. The FDR UL PPDU may directly use an HE TB PPDU.

In all L-SIGs of the DL/UL PPDUs of FIG. 23 and FIG. 24, a longest PPDU length may be set in consideration of all DL/UL transmissions. In addition, UL MU MIMO/OFDMA transmission is possible in the FDR UL PPDU similarly to the existing 11ax TB PPDU. Therefore, in case of OFDMA transmission, FDR-STF/FDR-LTF/DATA may be transmitted by being allocated with a corresponding RU size. A bandwidth subfield of FDR-SIG-A of the FDR UL PPDU may be identical to a BW subfield in a Common Info field of a trigger frame. That is, a punctured pattern may be informed, and 20/40/80/160/80+80 MHz may be simply indicated. A tone plan used in the FDR UL PPDU may be 20 MHz or 40 MHz according to the indicated punctured pattern. When a simple bandwidth is indicated, a 20 MHz tone plan may always be used. Alternatively, a bandwidth subfield of FDR-SIG-A of the FDR UL PPDU may always be set to 20 MHz, and a 20 MHz tone plan may always be used.

3) DL/UL Indication Using Trigger Frame

A trigger frame may provide an indication required in DL and UL transmission for FDR. An RA field may be divided into DL RA and UL RA fields. A Common Info field may be divided into common info, DL common info, and UL common fields. A User Info field may be divided into DL User Info and UL User Info fields.

The DL/UL RA field is an address of each DL/UL recipient STA.

The Common Info field may consist of Trigger Type and Length commonly used for DL/UL in the existing 11ax Common Info field, and may indicate FDR in a trigger type subfield as described in the case 1) of the proposal 2-1. A length subfield may indicate a longest PPDU length in consideration of both DL/UL transmission. The DL Common Info field may consist of subfields remaining after excluding Trigger Type/Length/Cascade indication/CS required/MU-MIMO LTF Mode/AP TX Power/Spatial Reuse (it is possible to exclude only some parts, for example, only 4 bits are used)/HE-SIG-A Reserved subfields from the existing 11ax Common Info field. The BW subfield of the DL Common Info field may indicate a puncturing pattern by using 3 bits identically to the bandwidth subfield of SIG-A of the HE MU PPDU, or may indicate only bandwidth information, not the puncturing pattern, by simply using only 2 bits. The reason above is that an additional indication is not necessary for the puncturing pattern because the DL User Info field indicates an RU used for each STA in RU allocation. The UL Common Info field may consist of subfields remaining after excluding Trigger Type/Length, or the like from the existing 11ax Common Info field. It is necessary to add a punctured channel subfield, and a 2-bit BW subfield may be used to indicate this. Each element may be configured with the same definition as proposed under the situation of the case 1) of the proposal 2-1.

Alternatively, the Common Info field may consist of Trigger Type, Length, and BW subfields. The BW subfield may simply indicate 20/40/80/160/80+80 MHz. Anyway, since which RU will be used is indicated in a User Info field, there is no big problem even if a punctured pattern is not indicated. However, a 1-bit DL/UL subfield may be defined in each DL/UL User Info field so that a corresponding STA can indicate whether it is DL or UL. A bandwidth to be configured may be a total bandwidth used in DL/UL transmission.

DL User Info and UL User Info fields may reuse the existing 11ax User Info field, and Target RSSI may be excluded from the DL User Info field. A 1-bit DL/UL subfield may be defined in each DL/UL User Info field, so that a corresponding STA can indicate whether it is DL or UL.

4) DL/UL Transmission in DL/UL Indication Using Trigger Frame

An FDR DL MU PPDU and an FDR UL PPDU may be transmitted simultaneously after a trigger frame is transmitted. The same PPDU structure as in the case 2) of the proposal 2-1 may be used. Alternatively, FDR-SIG-B may be excluded from the FDR DL MU PPDU, and FDR-SIG-A may also consist of only BSS Color, Spatial reuse, Bandwidth, TXOP, CRC, Tail, or the like. This may be the same as the subfield definition used in HE-SIG-A of the existing HE MU PPDU. Alternatively, the bandwidth subfield may be configured in the same definition as the BW subfield defined in the DL Common Info subfield of the trigger frame (it may be a puncturing pattern or 2 bits may be used to indicate only regarding 20/40/80/160/80+80 MHz).

A bandwidth subfield of FDR-SIG-A of the FDR UL PPDU may be identical to a BW subfield in a Common Info field of a trigger frame. That is, a punctured pattern may be informed, and 20/40/80/160/80+80 MHz may be simply indicated. A tone plan used in the FDR UL PPDU may be 20 MHz or 40 MHz according to the indicated punctured pattern. When a simple bandwidth is indicated, a 20 MHz tone plan may always be used. Alternatively, a bandwidth subfield of FDR-SIG-A of the FDR UL PPDU may always be set to 20 MHz, and a 20 MHz tone plan may always be used.

2-2. Preamble Puncturing Using 4 Bits

A BW subfield in HE-SIG-A of an HE MU PPDU for indicating preamble puncturing is defined with 3 bits. However, in order to consider more various cases, a reserved bit B7 of HE-SIG-A2 may be additionally used to consider various puncturing patterns by using 4 bits. That is, the puncturing pattern may be signaled with 4 bits in the HE MU PPDU. Although puncturing for a primary 20 MHz channel is not considered in 11ax at present, since DL and UL transmissions are both considered in FDR, a primary 20 MHz channel may be punctured, and this may be used in transmission of an FDR UL PPDU. An example of a 4-bit bandwidth subfield is shown below.

0000: 20 MHz,
0001: 40 MHz,
0010: 80 MHz non-preamble puncturing,
0011: 160/80+80 MHz non-preamble puncturing,
0100: 80 MHz w/primary 20 MHz puncturing,
0101: 80 MHz w/secondary 20 MHz puncturing,
0110: 80 MHz w/20 MHz puncturing corresponding to primary 20 MHz in secondary 40 MHz,
0111: 80 MHz w/20 MHz puncturing corresponding to secondary 20 MHz in secondary 40 MHz,
1000: 160/80+80 MHz w/primary 20 MHz puncturing,
1001: 160/80+80 MHz w/secondary 20 MHz puncturing,
1010: 160/80+80 MHz w/20 MHz puncturing corresponding to primary 20 MHz in secondary 40 MHz,
1011: 160/80+80 MHz w/20 MHz puncturing corresponding to secondary 20 MHz in secondary 40 MHz,
1100: 160/80+80 MHz w/primary 40 MHz puncturing,
1101: 160/80+80 MHz w/secondary 40 MHz puncturing,
1110: 160/80+80 MHz w/40 MHz puncturing corresponding to primary 40 MHz in secondary 80 MHz,
1111: 160/80+80 MHz w/40 MHz puncturing corresponding to secondary 40 MHz in secondary 80 MHz This is for one example only, and it may also be defined as another pattern.

1) UL Indication Using Trigger Frame

When a trigger frame is used for UL indication in this situation (when DL indication is not considered in the trigger frame), the existing trigger frame of the case 1) of the proposal 2-1 may be used. In this case, a BW subfield decreased to 1 bit and a 2 to 3-bit additional punctured channel subfield may be defined. The BW subfield may indicate whether a bandwidth used for transmission is 20

MHz or 40 MHz (only 1 bit can be used. The 1 bit may be used for the punctured channel field). In case of a 20 MHz bandwidth, a 2-bit punctured channel subfield may map primary 20 MHz, secondary 20 MHz, 20 Mz corresponding to primary 20 MHz in secondary 40 MHz, and 20 MHz corresponding to secondary 20 MHz in secondary 40 MHz to each element. In case of a 40 MHz bandwidth, the 2-bit punctured channel subfield may map primary 40 MHz, secondary 40 MHz, 40 MHz corresponding to primary 40 MHz in secondary 80 MHz, and 40 MHz corresponding to secondary 40 MHz in secondary 80 MHz to each element. Considering up to each 20 MHz puncturing of secondary 80 MHz, a punctured channel field of up to 3 bits may be required. That is, an indication may be additionally configured for 20 MHz corresponding to primary 20 MHz in secondary 80 MHz, 20 MHz corresponding to secondary 20 MHz in secondary 80 MHz, 20 MHz corresponding to primary 20 MHz of secondary 40 MHz in secondary 80 MHz, and 20 MHz corresponding to secondary 20 MHz of secondary 40 MHz in secondary 80 MHz. An FDR UL PPDU may use the method of 1.2). In this case, a bandwidth subfield decreased to 1 bit and an additional 2 to 3-bit punctured channel subfield is defined in FDR-SIG-A identically to the BW subfield and the punctured channel subframe in the trigger frame. In this case, a tone plan used in the FDR UL PPDU may be 20 MHz or 40 MHz according to the indicated punctured pattern. The FDR DL MU PPDU uses the existing method described in the case 2) of the proposal 2-1. In this case, a reserved bit B7 of HE-SIG-A2 is used together with the bandwidth subfield to indicate the puncturing pattern.

Alternatively, in the trigger frame, the BW subfield may simply indicate 20/40/80/160/80+80 MHz. Anyway, since which RU will be used is indicated in a User Info field, there is no big problem even if a punctured pattern is not indicated. A bandwidth to be configured may be simply 20 MHz, or may be a total bandwidth used in DL/UL transmission. In this case, the bandwidth subfield of FDR-SIG-A of the FDR UL PPDU may be identical to the BW subfield in the Common Info field of the trigger frame. That is, it may simply indicate 20/40/80/160/80+80 MHz. In this case, a tone plan used in the FDR UL PPDU may always use a 20 MHz tone plan. Alternatively, a bandwidth subfield of FDR-SIG-A of the FDR UL PPDU may always be set to 20 MHz, and the 20 MHz tone plan may always be used.

2) DL/UL Indication Using Trigger Frame

The trigger frame of the case 3) of the proposal 2-1 may be used for DL/UL indication using the trigger frame. A BW subfield of the DL Common Info field may be configured identically to the bandwidth subfield used in the FDR DL MU PPDU of the case 1) of the proposal 2-2 by using 4 bits, or may indicate only bandwidth information, not the puncturing pattern, by simply using only 2 bits. In addition, the UL Common Info field may define a BW subfield decreased to 1 bit and the 2 to 3-bit punctured channel subfield as in the case 1) of the proposal 2-2 in the trigger frame of the case 3) of the proposal 2-1.

Alternatively, if a 4-bit BW subfield indicates a clear puncturing pattern, the 4-bit BW subfield may be defined in the Common Info field. In this case, the BW subfield may be excluded from the DL/UL Common Info field, and the punctured channel subfield may also be excluded from the UL subfield.

The PPDU is based on the proposal of the case 2) of the proposal 2-1.

A 1-bit bandwidth subfield may be used in FDR-SIG-A of an FDR UL PPDU, and a reserved field may be used to define a 2 to 3-bit punctured channel subfield. However, since an AP knows that which one will be used for UL, the bandwidth subfield and the punctured channel subfield may be excluded, or only the punctured channel subfield may be excluded. In addition, 2 bits may be used for the bandwidth field as used conventionally. A tone plan used in the FDR UL PPDU may be 20 MHz or 40 MHz according to the indicated punctured pattern. When a simple bandwidth is indicated, a 20 MHz tone plan may always be used. Alternatively, a bandwidth subfield of FDR-SIG-A of the FDR UL PPDU may always be set to 20 MHz, and a 20 MHz tone plan may always be used.

FDR-SIG-B may be excluded from the FDR DL MU PPDU, and FDR-SIG-A may also consist of only BSS Color, Spatial reuse, Bandwidth, TXOP, CRC, Tail, or the like. This may be the same as the subfield definition used in HE-SIG-A of the existing HE MU PPDU except that the bandwidth subfield may consist of 4 bits. Alternatively, the bandwidth subfield may be configured in the same definition as the BW subfield defined in the DL Common Info subfield of the trigger frame (it may be a puncturing pattern or 2 bits may be used to indicate only regarding 20/40/80/160/80+80 MHz).

Alternatively, in the trigger frame, the Common Info field may consist of Trigger Type, Length, and BW subfields. The BW subfield may simply indicate 20/40/80/160/80+80 MHz. Anyway, since which RU will be used is indicated in a User Info field, there is no big problem even if a punctured pattern is not indicated. However, a 1-bit DL/UL subfield may be defined in each DL/UL User Info field so that a corresponding STA can indicate whether it is DL or UL. A bandwidth to be configured may be a total bandwidth used in DL/UL transmission. In this case, the bandwidth subfield of FDR-SIG-A of the FDR UL PPDU may be identical to the BW subfield in the Common Info field of the trigger frame. That is, it may simply indicate 20/40/80/160/80+80 MHz. In this case, a tone plan used in the FDR UL PPDU may always use a 20 MHz tone plan. Alternatively, a bandwidth subfield of FDR-SIG-A of the FDR UL PPDU may always be set to 20 MHz, and the 20 MHz tone plan may always be used.

2-3. General Preamble Puncturing

A general preamble puncturing situation may be proposed limitedly for a case of considering DL/UL indications at the same time by using a trigger frame. A trigger frame may provide an indication required in DL and UL transmission for FDR. An RA field may be divided into DL RA and UL RA fields. A Common Info field may be divided into common info, DL common info, and UL common fields. A User Info field may be divided into DL User Info and UL User Info fields.

The Common Info field may consist of Trigger Type, Length, and BW, and may indicate FDR in a trigger type subfield as described in the proposal 1.1). A length subfield may indicate a longest PPDU length in consideration of both DL/UL transmission. The BW subfield indicates the same BW to DL and UL, and indicates 20/40/80/160(or 80+80) MHz by using 2 bits. In the trigger frame for FDR, each STA assigned for UL transmission has to perform transmission to an AP by allocating not a total BW but only a 20 MHz band corresponding thereto (legacy preamble and SIG-A are transmitted only in unit of 20 MHz including an RU to which the STA is allocated, and FDR-STF, FDR-LTF, and DATA are transmitted only in unit of an RU to which the STA is allocated). That is, by performing transmission only with corresponding 20 MHz, interference to an STA for receiving a DL PPDU can be minimized, and the AP can also alleviate implementation complexity based on self-interference cancellation. In addition, a tone plan used in the FDR UL PPDU may always use a 20 MHz tone plan. The DL Common Info field may consist of subfields remaining after excluding Trigger Type/Length/Cascade indication/CS required/BW/MU-MIMO LTF Mode/AP TX Power/Spatial Reuse (it is possible to exclude only some parts, for example, only 4 bits are used)/HE-SIG-A Reserved subfields from the existing 11ax Common Info field. The UL Common Info field may consist of subfields remaining after excluding Trigger Type/Length/BW subfield, or the like from the existing 11 ax Common Info field.

DL User Info and UL User Info fields may reuse the existing 11ax User Info field, and Target RSSI may be excluded from the DL User Info field. However, a 1-bit DL/UL subfield may be defined in each DL/UL User Info field, so that a corresponding STA can indicate whether it is DL or UL. For example, DL may be set to 0, and UL may be set to 1.

In such a situation, an FDR DL MU PPDU may reuse the existing HE MU PPDU as in the case 2) of the proposal 2-1. In this case, FDR-SIG-B may be excluded, and FDR-SIG-A may also consist of only BSS Color, Spatial reuse, TXOP, bandwidth, CRC, Tail, or the like, and a bandwidth may be set identically to that defined in the trigger frame. An FDR UL PPDU may reuse the existing HE TB PPDU as in the case 2) of the proposal 2-1. In this case, the bandwidth subfield may be identical to the BW subfield in the Common Info field of the trigger frame. That is, it may simply indicate 20/40/80/160/80+80 MHz. In this case, a tone plan used in the FDR UL PPDU may always use a 20 MHz tone plan. Alternatively, a bandwidth subfield of FDR-SIG-A of the FDR UL PPDU may always be set to 20 MHz, and the 20 MHz tone plan may always be used.

2-4. Extend to General FDR

The signaling method proposed in the general preamble puncturing situation of the proposal 2-3 may be directly applied in a general FDR situation. The general FDR is a method in which preamble puncturing is not performed and FDR is performed in the total bandwidth. Therefore, a tone plan for the total bandwidth is used in DL/UL transmission. That is, it may be directly applied to FDR in which a channel is not divided for DL/UL transmission, and DL and UL transmissions are simultaneously considered in all channels. Of course, in this situation, a method for efficiently mitigating inter-STA interference as well as self-interference cancellation shall be accompanied.

A trigger frame may provide an indication required in DL and UL transmission for FDR. An RA field may be divided into DL RA and UL RA fields. A Common Info field may be divided into common info, DL common info, and UL common fields. A User Info field may be divided into DL User Info and UL User Info fields.

The Common Info field may consist of Trigger Type, Length, and BW, and may indicate FDR in a trigger type subfield as described in the proposal 1.1). A length subfield may indicate a longest PPDU length in consideration of both DL/UL transmission. The BW subfield indicates the same BW to DL and UL, and indicates 20/40/80/160 (or 80+80) MHz by using 2 bits. In the trigger frame for FDR, each STA assigned for UL transmission may perform transmission to an AP by allocating not a total BW but only a 20 MHz band corresponding thereto (legacy preamble and SIG-A are transmitted only in unit of 20 MHz including an RU to which the STA is allocated, and FDR-STF, FDR-LTF, and DATA are transmitted only in unit of an RU to which the STA is allocated). In addition, a tone plan used in an FDR UL PPDU may use a tone plan of a bandwidth indicated in the BW subfield or a 20 MHz tone plan. The DL Common Info field may consist of subfields remaining after excluding Trigger Type/Length/Cascade indication/CS required/BW/MU-MIMO LTF Mode/AP TX Power/Spatial Reuse (it is possible to exclude only some parts, for example, only 4 bits are used)/HE-SIG-A Reserved subfields from the existing 11 ax Common Info field. The UL Common Info field may consist of subfields remaining after excluding Trigger Type/Length BW subfield, or the like from the existing 11ax Common Info field.

DL User Info and UL User Info fields may reuse the existing 11ax User Info field, and Target RSSI may be excluded from the DL User Info field. However, a 1-bit DL/UL subfield may be defined in each DL/UL User Info field, so that a corresponding STA can indicate whether it is DL or UL. For example, DL may be set to 0, and UL may be set to 1.

In such a situation, an FDR DL MU PPDU may reuse the existing HE MU PPDU as in the case 2) of the proposal 2-1. In this case, FDR-SIG-B may be excluded, and FDR-SIG-A may also consist of only BSS Color, Spatial reuse, TXOP, bandwidth, CRC, Tail, or the like, and a bandwidth may be set identically to that defined in the trigger frame. An FDR UL PPDU may reuse the existing HE TB PPDU as in the case 2) of the proposal 2-1. In this case, the bandwidth subfield may be identical to the BW subfield in the Common Info field of the trigger frame. That is, it may simply indicate 20/40/80/160/80+80 MHz. In this case, as described above, the FDR UL PPDU may be transmitted in unit of 20 MHz band, and a tone plan used in this case may use a tone plan of an indicated bandwidth or a 20 MHz tone plan. Alternatively, a bandwidth subfield of FDR-SIG-A of the FDR UL PPDU may always be set to 20 MHz, and the 20 MHz tone plan may always be used.

A simultaneous DL/UL indication method using a trigger frame is preferred in the above proposals of 2-1, 2-2, 2-3, and 2-4. In doing so, it is possible to prevent scheduling from being performed twice in the trigger frame and the DL PPDU, and an overhead of the DL PPDU can be decreased. In such a situation, a configuration of the Common Info field of the trigger frame may consist of Trigger Type/Length/BW subfield, and the BW subfield preferably indicates the total bandwidth used in DL/UL simply by using 2 bits rather than a puncturing pattern. In addition, a 1-bit DL/UL subfield may be additionally defined in each DL/UL User Info field to indicate whether a channel or RU to which a corresponding STA is allocated is for DL/UL in an intuitive manner, thereby avoiding a method of notifying a puncturing pattern in a complex manner. In such a situation, the DL MU PPDU consists of only BSS Color, Spatial reuse, TXOP, bandwidth, CRC, Tail, or the like by excluding the existing FDR-SIG-B, and a bandwidth is preferably set identically to that defined in the trigger frame to minimize an overhead. In addition, the bandwidth subfield of the UL PPDU is simply set to 20 MHZ, and a 20 MHz tone plan is also preferably used for a tone plan (except for the propose 2-4 in which the bandwidth subfield of the UL PPDU is the same as the BW subfield of the trigger frame, and the tone plan uses an indicated bandwidth, and transmission is preferably performed only in unit of corresponding 20 MHz). The reason is that the use of the 20 MHz tone plan results in the decrease in interference to or from adjacent 20 MHz through a guard tone, thereby alleviating complexity based on self-interference cancellation and inter-STA interference mitigation implementation.

The FDR indication proposed in the case 2-1 may be inserted to all of the trigger frames and FDR PPDUs described above.

When asymmetric FDR is considered (FDR is capable only in an AP), DL and UL transmissions may be simultaneously performed (for this, self-interference channel measurement is necessary in advance by using a beacon, a trigger frame, or the like). However, in order to cancel self-interference which occurs when DL transmission is performed in the AP in practice, a procedure such as channel measurement is necessarily performed before UL transmission. Therefore, UL transmission may be performed after a specific time/symbol (delay). For example, transmission may be performed immediately after DL L-LTF transmission ends or immediately after FDR-LTF transmission ends. In this case, by considering a UL PPDU length including a delay, the length subfield of the trigger frame may be set to a maximum length between the UL PPDU length and a DL PPDU length. Length information in the DL PPDU may be set identically to the length subfield of the trigger frame, and length information in the UL PPDU may be set to a 'length configured in the length subfield of the trigger frame'—delay.

In case of symmetric FDR, the STA may also require self-interference cancellation. Therefore, UL transmission may first start to perform channel measurement, and this may be used to perform self-interference cancellation. DL transmission may be performed immediately after L-LTF transmission ends or immediately after FDR-LTF transmission ends. In this case, DL self-interference cancellation may be performed by using a channel which is measured in advance by using a beacon, a trigger frame, or the like. In this case, by considering a DL PPDU length including a delay, the length subfield of the trigger frame may be set to a maximum length between the DL PPDU length and a UL PPDU length. Length information in the UL PPDU may be set identically to the length subfield of the trigger frame, and length information in the DL PPDU may be set to a 'length configured in the length subfield of the trigger frame'—delay.

Hereinafter, the aforementioned embodiment will be described over time with reference to FIG. 25 and FIG. 26.

Figure 25:
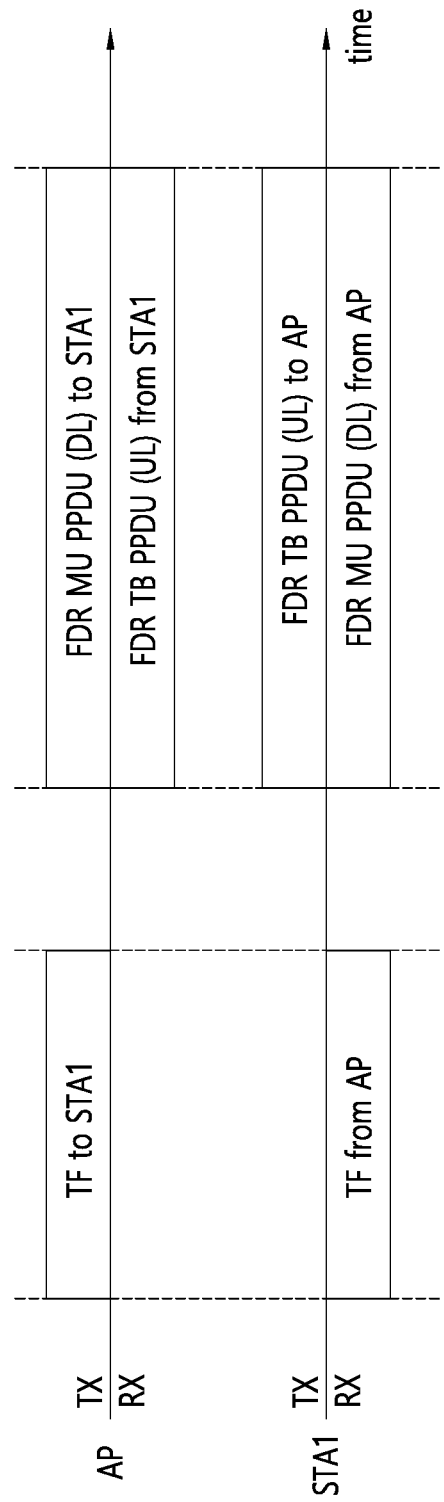
FIG. 25 illustrates a procedure according to which DL transmission and UL transmission are performed based on symmetric FDR according to the present embodiment.

FIG. 25 illustrates a procedure according to which DL transmission and UL transmission are performed based on symmetric FDR according to the present embodiment.

FIG. 25 illustrates symmetric FDR in which FDR-based transmission and reception occur only in an AP and an STA1.

Referring to FIG. 25, the AP may transmit a trigger frame to the STA1.

The STA1 may transmit an FDR TB PPDU to the AP, based on the trigger frame. The FDR TB PPDU may be generated by directly using an HE TB PPDU. In addition, the FDR TB PPDU includes both a control field and a data field.

The AP may transmit an FDR MU PPDU to the STA1, based on the trigger frame. The FDR MU PPDU may be generated by directly using the HE MU PPDU. That is, the FDR TB PPDU and the FDR MU PPDU are simultaneously transmitted/received based on the FDR. In this case, a field overlapping with a field for allocation information included in the trigger frame may be omitted in the FDR TB PPDU and the FDR MU PPDU.

Since the trigger frame may simultaneously indicate DL transmission and UL transmission, the FDR MU PPDU and the FDR TB PPDU may be simultaneously transmitted/received. However, FDR may be performed with a time corresponding to a gap between the FDR MU PPDU and the FDR TB PPDU. Since the FDR MU PPDU and the FDR TB PPDU are transmitted with different RUs, interference caused by FDR may be decreased.

The FDR TB PPDU and the FDR MU PPDU will be described below in detail with reference to FIG. 27 and FIG. 28.

FIG. 26 illustrates a procedure according to which DL transmission and UL transmission are performed based on asymmetric FDR according to the present embodiment.

FIG. 26 illustrates asymmetric FDR in which FDR-based DL transmission occurs between an AP and an STA1 and STA2, and FDR-based UL transmission occurs between the AP and an STA3.

Referring to FIG. 26, the AP may first transmit a trigger frame to the STA1 to the STA 3.

The STA1 and the STA2 may transmit an FDR TB PPDU to the AP, based on the trigger frame. The FDR TB PPDU may be generated by directly using an HE TB PPDU. In addition, the FDR TB PPDU includes both a control field and a data field.

The AP may transmit an FDR MU PPDU to the STA3, based on the trigger frame. The FDR MU PPDU may be generated by directly using the HE MU PPDU. In this case, the STA1 and the STA2 transmit the FDR TB PPDU to the AP. That is, the FDR TB PPDU transmitted by the STA1 and STA2 and the FDR MU PPDU transmitted by the AP are transmitted/received based on the FDR. In this case, a field overlapping with a field for allocation information included in the trigger frame may be omitted in the FDR TB PPDU and the FDR MU PPDU.

Since the trigger frame may simultaneously indicate DL transmission and UL transmission, the FDR MU PPDU and the FDR TB PPDU may be simultaneously transmitted/received. However, FDR may be performed with a time corresponding to a gap between the FDR MU PPDU and the FDR TB PPDU. Since the FDR MU PPDU and the FDR TB PPDU are transmitted with different RUs, interference caused by FDR may be decreased.

The FDR TB PPDU and the FDR MU PPDU will be described below in detail with reference to FIG. 27 and FIG. 28.

Figure 27:
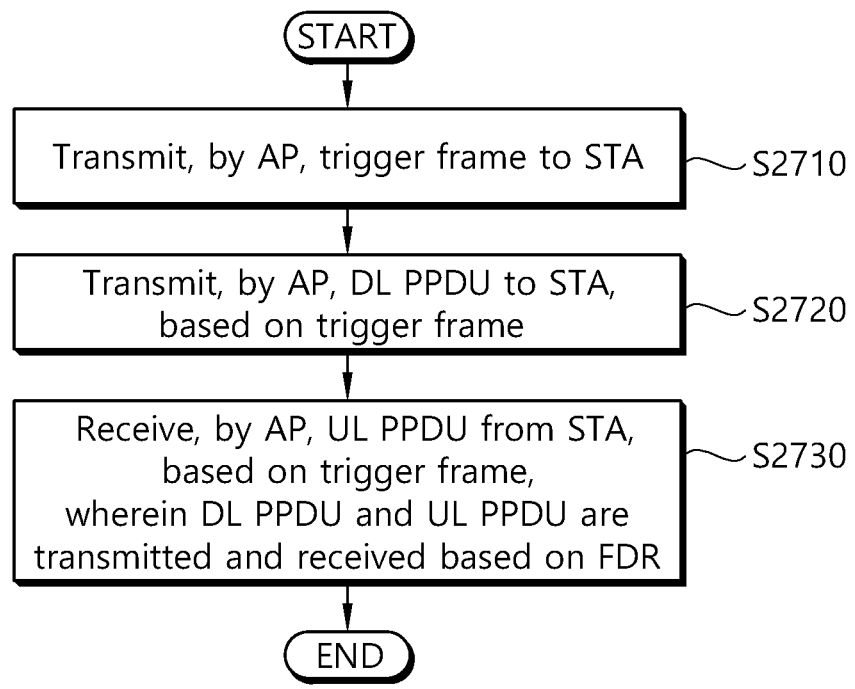
FIG. 27 is a flow diagram illustrating a procedure according to which DL transmission and UL transmission are performed based on FDR in an AP according to the present embodiment.

FIG. 27 is a flow diagram illustrating a procedure according to which DL transmission and UL transmission are performed based on FDR in an AP according to the present embodiment.

An example of FIG. 27 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE-SIG-A field, and an HE-SIG-B field may all be PPDUs and fields defined in the 802.11ax system. An FDR MU PPDU, an FDR TB PPDU, an FDR-SIG-A field, and an FDR-SIG-B field may be PPDUs and fields defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The example of FIG. 27 may be performed in a transmitting device, and the transmitting device may correspond to an access point (AP). A receiving device of FIG. 27 may correspond to a station (STA) (non AP STA) having FDR capability. In addition, the example of FIG. 27 may include both a symmetric FDR operation and an asymmetric FDR operation.

In step S2710, the AP transmits a trigger frame to the STA.

In step S2720, the AP transmits a downlink (DL) PPDU to the STA, based on the trigger frame. The DL PPDU may be generated by using a high efficiency multi user PPDU (HE MU PPDU). That is, the DL PPDU may be an FDR MU PPDU generated by reusing the HE MU PPDU.

In step S2730, the AP receives an uplink (UL) PPDU from the STA, based on the trigger frame. The UL PPDU may be generated by using a high efficiency trigger-based PPDU (HE TB PPDU). That is, the UL PPDU may be an FDR TB PPDU generated by using the HE TB PPDU. In this case, the DL PPDU and the UL PPDU are transmitted/received based on the FDR.

The present embodiment proposes a method of signaling control information for DL transmission and UL transmission simultaneously by using the trigger frame. The trigger frame proposed in the present embodiment may be defined as follows.

The trigger frame includes a first common information field.

The first common information field includes a trigger type field, a length field, and a bandwidth field. The first common information field may be a field in which control information of the DL and UL PPDUs is generated simultaneously.

The length field includes information on a length of a longest PPDU among the DL and UL PPDUs. The bandwidth field includes information on a total bandwidth at which the DL and UL PPDUs are transmitted.

The trigger frame may further include a second common information field for the DL PPDU and a third common information field for the UL PPDU. In this case, the second and third common information fields may not include the trigger type field, the length field, and the bandwidth field. This is because there is no need to redundantly insert a field included in the first common information field.

The trigger frame may further include a first user information field for the DL PPDU and a second user information field for the UL PPDU.

The first user information field may include allocation information of a first resource unit (RU) in which the DL PPDU is transmitted. The second user information field may include allocation information of a second RU in which the UL PPDU is transmitted. That is, the DL PPDU and the UL PPDU are transmitted and received simultaneously based on FDR in such a manner that the DL PPDU is transmitted in the first RU and the UL PPDU is transmitted in the second RU. Accordingly, the DL PPDU and the UL PPDU are completely divided in frequency (completely divided into the first RU and the second RU) to reduce an influence of interference based on FDR.

A first signal field included in the DL PPDU may include a first bandwidth field. The first bandwidth field may include information on a bandwidth at which the DL PPDU is transmitted.

A second signal field included in the UL PPDU may include a second bandwidth field. The second bandwidth field may include information on a bandwidth at which the UL PPDU is transmitted.

A bandwidth at which the UL PPDU is transmitted may be 20 MHz. In this case, the first RU may be determined based on a tone plan for the total bandwidth. The second RU may be determined based on a tone plan for 20 MHz.

The aforementioned tone plan may be a tone plan defined in 802.11ax. For example, it is assumed that the total bandwidth is 40 MHz, the DL PPDU is transmitted at primary 20 MHz, and the UL PPDU is transmitted at secondary 20 MHz. In this case, the first RU in which the DL PPDU is transmitted may be determined by using a tone plan for 40 MHz, and the second RU in which the UL PPDU is transmitted may be determined by using a tone plan for 20 MHz.

The first user information field may include information on whether the STA receives the DL PPDU. The second user information field may include information on whether the STA transmits the UL PPDU. That is, whether the STA performs DL transmission or performs UL transmission may be known through the information.

Information on the total bandwidth may consist of 2 bits. The total bandwidth may be determined to one of 20 MHz, 40 MHz, 80 MHz, and 160(80+80)MHz, based on the 2 bits.

The trigger type field may include FDR indication information on that the STA can perform the FDR. The FDR indication information may be included in a reserved bit of the trigger type field.

The DL PPDU may be generated by using a high efficiency multi user PPDU (HE MU PPDU). The UL PPDU may be generated by using a high efficiency trigger-based PPDU (HE TB PPDU).

The first signal field may be related to an HE-SIG-A field of the HE MU PPDU. The second signal field may be related to an HE-SIG-A field of the HE TB PPDU.

The DL PPDU may not include an HE-SIG-B field of the HE MU PPDU. This is because allocation information of the DL PPDU and UL PPDU is signaled through a first user information field and second user information field in the trigger frame.

The first and second bandwidth fields may be configured to be identical to the bandwidth field included in the first common information field. That is, a bandwidth (BW) field of FDR-SIG-A of the FDR MU PPDU and FDR TB PPDU may be configured to be identical to the BW field of the trigger frame.

Figure 28:
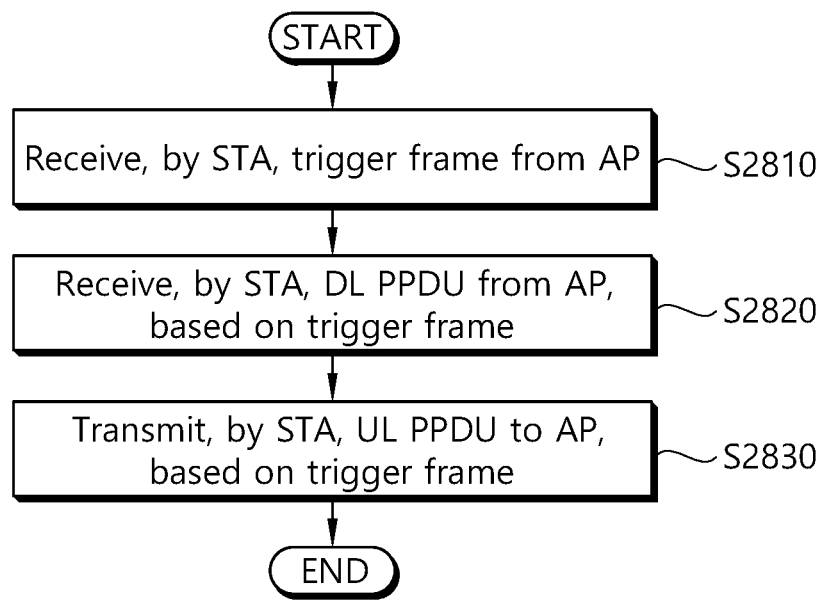
FIG. 28 is a flow diagram illustrating a procedure according to which UL transmission and DL transmission are performed based on FDR in an STA according to the present embodiment.

FIG. 28 is a flow diagram illustrating a procedure according to which UL transmission and DL transmission are performed based on FDR in an STA according to the present embodiment.

An example of FIG. 28 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE-SIG-A field, and an HE-SIG-B field may all be PPDUs and fields defined in the 802.11ax system. An FDR MU PPDU, an FDR TB PPDU, an FDR-SIG-A field, and an FDR-SIG-B field may be PPDUs and fields defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The example of FIG. 28 may be performed in a receiving device, and the receiving device may correspond to a station (STA) (non AP STA) having FDR capability. In addition, the example of FIG. 28 may include both a symmetric FDR operation and an asymmetric FDR operation.

In step S2810, the STA receives a trigger frame from an access point (AP).

In step S2820, the STA receives a downlink (DL) PPDU from the AP, based on the trigger frame. The DL PPDU may be generated by using a high efficiency multi user PPDU (HE MU PPDU). That is, the DL PPDU may be an FDR MU PPDU generated by reusing the HE MU PPDU.

In step S2830, the STA transmits an uplink (UL) PPDU to the AP, based on the trigger frame. The UL PPDU may be generated by using a high efficiency trigger-based PPDU (HE TB PPDU). That is, the UL PPDU may be an FDR TB PPDU generated by using the HE TB PPDU. In this case, the DL PPDU and the UL PPDU are transmitted/received based on the FDR.

The present embodiment proposes a method of signaling control information for DL transmission and UL transmission simultaneously by using the trigger frame. The trigger frame proposed in the present embodiment may be defined as follows.

The trigger frame includes a first common information field.

The first common information field includes a trigger type field, a length field, and a bandwidth field. The first common information field may be a field in which control information of the DL and UL PPDUs is generated simultaneously.

The length field includes information on a length of a longest PPDU among the DL and UL PPDUs. The bandwidth field includes information on a total bandwidth at which the DL and UL PPDUs are transmitted.

The trigger frame may further include a second common information field for the DL PPDU and a third common information field for the UL PPDU. In this case, the second and third common information fields may not include the trigger type field, the length field, and the bandwidth field. This is because there is no need to redundantly insert a field included in the first common information field.

The trigger frame may further include a first user information field for the DL PPDU and a second user information field for the UL PPDU.

The first user information field may include allocation information of a first resource unit (RU) in which the DL PPDU is transmitted. The second user information field may include allocation information of a second RU in which the UL PPDU is transmitted. That is, the DL PPDU and the UL PPDU are transmitted and received simultaneously based on FDR in such a manner that the DL PPDU is transmitted in the first RU and the UL PPDU is transmitted in the second RU. Accordingly, the DL PPDU and the UL PPDU are completely divided in frequency (completely divided into the first RU and the second RU) to reduce an influence of interference based on FDR.

A first signal field included in the DL PPDU may include a first bandwidth field. The first bandwidth field may include information on a bandwidth at which the DL PPDU is transmitted.

A second signal field included in the UL PPDU may include a second bandwidth field. The second bandwidth field may include information on a bandwidth at which the UL PPDU is transmitted.

A bandwidth at which the UL PPDU is transmitted may be 20 MHz. In this case, the first RU may be determined based on a tone plan for the total bandwidth. The second RU may be determined based on a tone plan for 20 MHz.

The aforementioned tone plan may be a tone plan defined in 802.11ax. For example, it is assumed that the total bandwidth is 40 MHz, the DL PPDU is transmitted at primary 20 MHz, and the UL PPDU is transmitted at secondary 20 MHz. In this case, the first RU in which the DL PPDU is transmitted may be determined by using a tone plan for 40 MHz, and the second RU in which the UL PPDU is transmitted may be determined by using a tone plan for 20 MHz.

The first user information field may include information on whether the STA receives the DL PPDU. The second user information field may include information on whether the STA transmits the UL PPDU. That is, whether the STA performs DL transmission or performs UL transmission may be known through the information.

Information on the total bandwidth may consist of 2 bits. The total bandwidth may be determined to one of 20 MHz, 40 MHz, 80 MHz, and 160(80+80)MHz, based on the 2 bits.

The trigger type field may include FDR indication information on that the STA can perform the FDR. The FDR indication information may be included in a reserved bit of the trigger type field.

The DL PPDU may be generated by using a high efficiency multi user PPDU (HE MU PPDU). The UL PPDU may be generated by using a high efficiency trigger-based PPDU (HE TB PPDU).

The first signal field may be related to an HE-SIG-A field of the HE MU PPDU. The second signal field may be related to an HE-SIG-A field of the HE TB PPDU.

The DL PPDU may not include an HE-SIG-B field of the HE MU PPDU. This is because allocation information of the DL PPDU and UL PPDU is signaled through a first user information field and second user information field in the trigger frame.

The first and second bandwidth fields may be configured to be identical to the bandwidth field included in the first common information field. That is, a bandwidth (BW) field of FDR-SIG-A of the FDR MU PPDU and FDR TB PPDU may be configured to be identical to the BW field of the trigger frame.

3 Device Configuration

Figure 29:
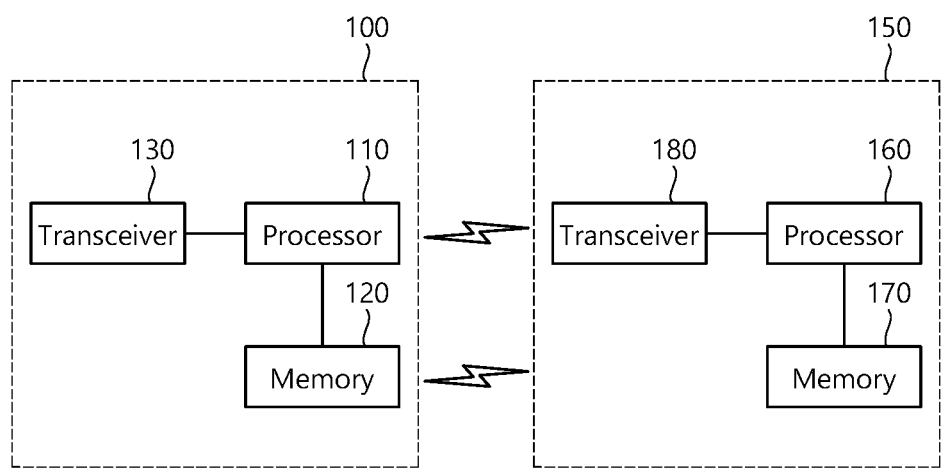
FIG. 29 is a diagram describing a device for implementing the above-described method.

FIG. 29 is a diagram describing a device for implementing the above-described method.

A wireless device (100) of FIG. 29 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

The operation of the processor 110 of the transmitting device will be described in detail as follows. The processor 110 of the transmitting device transmits a trigger frame to a station (STA), transmits a downlink (DL) PPDU to the STA, based on the trigger frame, and receives an uplink (UL) PPDU from the STA, based on the trigger frame. In this case, the DL PPDU and the UL PPDU are transmitted/received based on the FDR.

The operation of the processor 160 of the receiving device will be described in detail as follows. The processor 160 of the receiving device receives a trigger frame to an access point (AP), receives a downlink (DL) PPDU from the AP, based on the trigger frame, and transmits an uplink (UL) PPDU to the AP, based on the trigger frame. In this case, the DL PPDU and the UL PPDU are transmitted/received based on the FDR.

Figure 30:
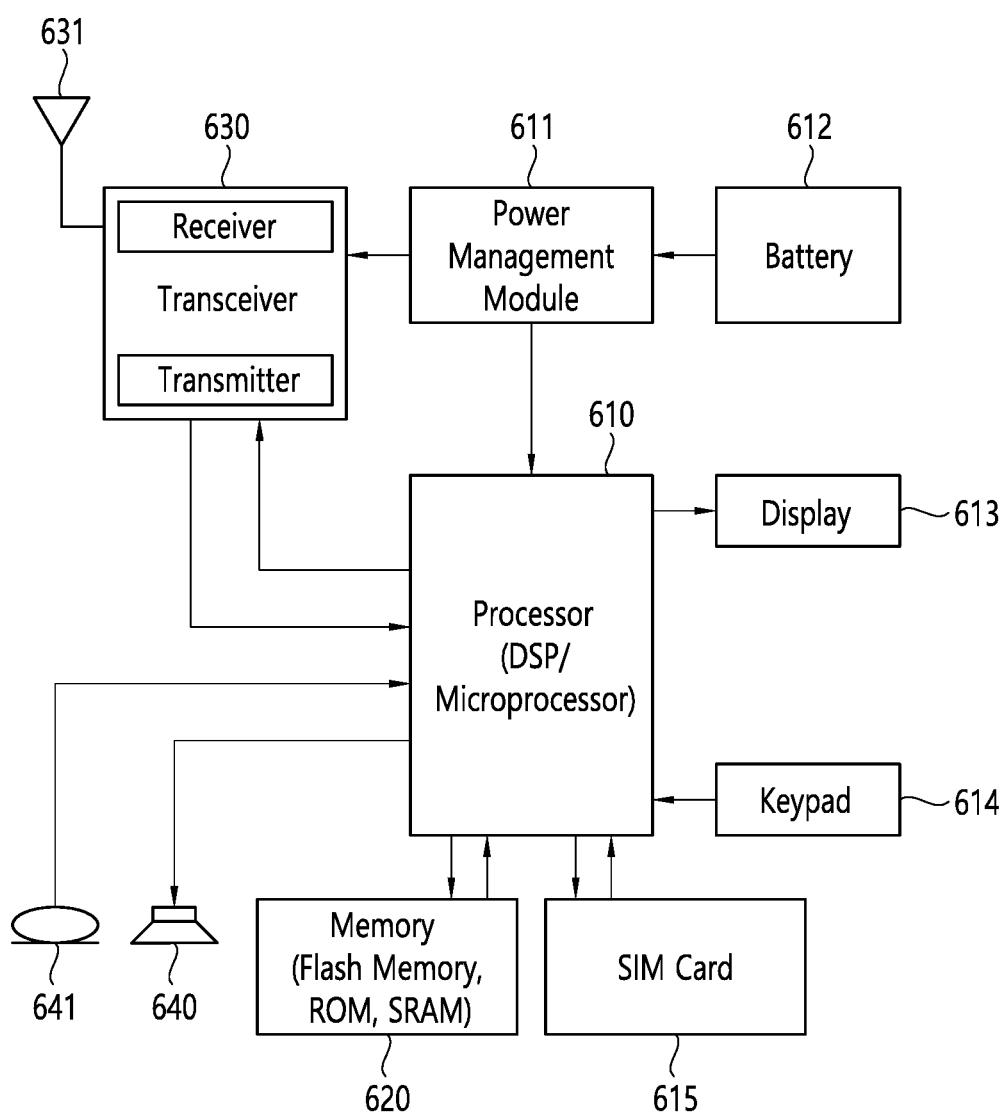
FIG. 30 illustrates a wireless device in detail for implementing an embodiment of the present specification.

FIG. 30 illustrates a wireless device in detail for implementing an embodiment of the present specification. The aforementioned present specification for the transmitting device or the receiving device may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of the transmitting device, the processor 610 transmits a trigger frame to a station (STA), transmits a downlink (DL) PPDU to the STA, based on the trigger frame, and receives an uplink (UL) PPDU from the STA, based on the trigger frame. In this case, the DL PPDU and the UL PPDU are transmitted/received based on the FDR.

In case of the receiving device, the processor 610 receives a trigger frame to an access point (AP), receives a downlink (DL) PPDU from the AP, based on the trigger frame, and transmits an uplink (UL) PPDU to the AP, based on the trigger frame. In this case, the DL PPDU and the UL PPDU are transmitted/received based on the FDR.

The present embodiment proposes a method of signaling control information for DL transmission and UL transmission simultaneously by using the trigger frame. The trigger frame proposed in the present embodiment may be defined as follows.

The trigger frame includes a first common information field.

The first common information field includes a trigger type field, a length field, and a bandwidth field. The first common information field may be a field in which control information of the DL and UL PPDUs is generated simultaneously.

The length field includes information on a length of a longest PPDU among the DL and UL PPDUs. The bandwidth field includes information on a total bandwidth at which the DL and UL PPDUs are transmitted.

The trigger frame may further include a second common information field for the DL PPDU and a third common information field for the UL PPDU. In this case, the second and third common information fields may not include the trigger type field, the length field, and the bandwidth field. This is because there is no need to redundantly insert a field included in the first common information field.

The trigger frame may further include a first user information field for the DL PPDU and a second user information field for the UL PPDU.

The first user information field may include allocation information of a first resource unit (RU) in which the DL PPDU is transmitted. The second user information field may include allocation information of a second RU in which the UL PPDU is transmitted. That is, the DL PPDU and the UL PPDU are transmitted and received simultaneously based on FDR in such a manner that the DL PPDU is transmitted in the first RU and the UL PPDU is transmitted in the second RU. Accordingly, the DL PPDU and the UL PPDU are completely divided in frequency (completely divided into the first RU and the second RU) to reduce an influence of interference based on FDR.

A first signal field included in the DL PPDU may include a first bandwidth field. The first bandwidth field may include information on a bandwidth at which the DL PPDU is transmitted.

A second signal field included in the UL PPDU may include a second bandwidth field. The second bandwidth field may include information on a bandwidth at which the UL PPDU is transmitted.

A bandwidth at which the UL PPDU is transmitted may be 20 MHz. In this case, the first RU may be determined based on a tone plan for the total bandwidth. The second RU may be determined based on a tone plan for 20 MHz.

The aforementioned tone plan may be a tone plan defined in 802.11ax. For example, it is assumed that the total bandwidth is 40 MHz, the DL PPDU is transmitted at primary 20 MHz, and the UL PPDU is transmitted at secondary 20 MHz. In this case, the first RU in which the DL PPDU is transmitted may be determined by using a tone plan for 40 MHz, and the second RU in which the UL PPDU is transmitted may be determined by using a tone plan for 20 MHz.

The first user information field may include information on whether the STA receives the DL PPDU. The second user information field may include information on whether the STA transmits the UL PPDU. That is, whether the STA performs DL transmission or performs UL transmission may be known through the information.

Information on the total bandwidth may consist of 2 bits. The total bandwidth may be determined to one of 20 MHz, 40 MHz, 80 MHz, and 160(80+80)MHz, based on the 2 bits.

The trigger type field may include FDR indication information on that the STA can perform the FDR. The FDR indication information may be included in a reserved bit of the trigger type field.

The DL PPDU may be generated by using a high efficiency multi user PPDU (HE MU PPDU). The UL PPDU may be generated by using a high efficiency trigger-based PPDU (HE TB PPDU).

The first signal field may be related to an HE-SIG-A field of the HE MU PPDU. The second signal field may be related to an HE-SIG-A field of the HE TB PPDU.

The DL PPDU may not include an HE-SIG-B field of the HE MU PPDU. This is because allocation information of the DL PPDU and UL PPDU is signaled through a first user information field and second user information field in the trigger frame.

The first and second bandwidth fields may be configured to be identical to the bandwidth field included in the first common information field. That is, a bandwidth (BW) field of FDR-SIG-A of the FDR MU PPDU and FDR TB PPDU may be configured to be identical to the BW field of the trigger frame.

What is claimed is:

1. A method of transmitting and receiving a physical layer protocol data unit (PPDU), based on full-duplex radio (FDR), in a wireless local area network (WLAN) system, the method comprising:
    transmitting, by an access point (AP), a trigger frame to a station (STA);
    transmitting, by the AP, a downlink (DL) PPDU to the STA, based on the trigger frame; and
    receiving, by the AP, an uplink (UL) PPDU from the STA, based on the trigger frame,
    wherein the trigger frame comprises a first common information field,
    wherein the first common information field comprises a trigger type field, a length field, a bandwidth field and a preamble puncturing field,
    wherein the bandwidth field comprises first information on a total bandwidth for the DL and UL PPDUs,
    wherein the preamble puncturing field comprises second information on a puncturing pattern for the total bandwidth,
    wherein the second information comprises information on that a primary 20 MHz channel of the total bandwidth is punctured,
    wherein the UL PPDU is received through the primary 20 MHz channel based on the second information,
    wherein the DL PPDU and the UL PPDU are based on the FDR,
    wherein a start time of the UL PPDU and a start time of the DL PPDU have a delay of a specific time,
    wherein the specific time is set to a time immediately after a Legacy-Short Training Field (L-STF) of the DL PPDU is sent,
    wherein the length field comprises information on a maximum value among first and second lengths,
    wherein the first length is a length of the DL PPDU, and
    wherein the second length is a sum of a length of the UL PPDU and a length of the specific time.

2. The method of claim 1,
    wherein the trigger frame further comprises a first user information field for the DL PPDU and a second user information field for the UL PPDU,
    wherein the first user information field comprises allocation information of a first resource unit (RU) in which the DL PPDU is transmitted, and
    wherein the second user information field comprises allocation information of a second RU in which the UL PPDU is received.

3. The method of claim 2,
    wherein a first signal field comprised in the DL PPDU comprises a first bandwidth field,
    wherein the first bandwidth field comprises information on a bandwidth at which the DL PPDU is transmitted,
    wherein a second signal field comprised in the UL PPDU comprises a second bandwidth field, and
    wherein the second bandwidth field comprises information on a bandwidth at which the UL PPDU is received.

4. The method of claim 3,
    wherein the bandwidth at which the UL PPDU is received is 20 MHz,
    wherein the first RU is determined based on a tone plan for the total bandwidth, and
    wherein the second RU is determined based on a tone plan for the 20 MHz.

5. The method of claim 2,
    wherein the first user information field comprises information on whether the STA receives the DL PPDU, and wherein the second user information field comprises information on whether the STA transmits the UL PPDU.

6. The method of claim 1,
wherein information on the total bandwidth consists of 2 bits, and
wherein the total bandwidth is determined to be any one of 20 MHz, 40 MHz, 80 MHz, or 160(80+80)MHz, based on the 2 bits.

7. The method of claim 1,
wherein the trigger type field comprises FDR indication information on that the STA can perform the FDR, and
wherein the FDR indication information is comprised in a reserved bit of the trigger type field.

8. The method of claim 3,
wherein the DL PPDU is generated by using a high efficiency multi user PPDU (HE MU PPDU),
wherein the UL PPDU is generated by using a high efficiency trigger-based PPDU (HE TB PPDU),
wherein the first signal field is related to an HE-SIG-A field of the HE MU PPDU, and
wherein the second signal field is related to an HE-SIG-A field of the HE TB PPDU.

9. The method of claim 8,
wherein the DL PPDU does not include an HE-SIG-B field of the HE MU PPDU, and
wherein the first and second bandwidth fields are configured identically to the bandwidth field comprised in the first common information field.

10. An access point (AP) wireless device for transmitting and receiving a physical layer protocol data unit (PPDU), based on full-duplex radio (FDR), in a wireless local area network (WLAN) system, the wireless device comprising:
a memory;
a transceiver; and
a processor operatively coupled to the memory and the transceiver, wherein the processor is configured to:
transmit a trigger frame to a station (STA);
transmit a downlink (DL) PPDU to the STA, based on the trigger frame; and
receive an uplink (UL) PPDU from the STA, based on the trigger frame,
wherein the trigger frame comprises a first common information field,
wherein the first common information field comprises a trigger type field, a length field, a bandwidth field and a preamble puncturing field,
wherein the bandwidth field comprises first information on a total bandwidth for the DL and UL PPDUs,
wherein the preamble puncturing field comprises second information on a puncturing pattern for the total bandwidth,
wherein the second information comprises information on that a primary 20 MHz channel of the total bandwidth is punctured,
wherein the UL PPDU is received through the primary 20 MHz channel based on the second information,
wherein the DL PPDU and the UL PPDU are based on the FDR,
wherein a start time of the UL PPDU and a start time of the DL PPDU have a delay of a specific time,
wherein the specific time is set to a time immediately after a Legacy-Short Training Field (L-STF) of the DL PPDU is sent,
wherein the length field comprises information on a maximum value among first and second lengths,
wherein the first length is a length of the DL PPDU, and
wherein the second length is a sum of a length of the UL PPDU and a length of the specific time.

11. The wireless device of claim 10,
wherein the trigger frame further comprises a first user information field for the DL PPDU and a second user information field for the UL PPDU,
wherein the first user information field comprises allocation information of a first resource unit (RU) in which the DL PPDU is transmitted, and
wherein the second user information field comprises allocation information of a second RU in which the UL PPDU is received.

12. The wireless device of claim 11,
wherein a first signal field comprised in the DL PPDU comprises a first bandwidth field,
wherein the first bandwidth field comprises information on a bandwidth at which the DL PPDU is transmitted,
wherein a second signal field comprised in the UL PPDU comprises a second bandwidth field, and
wherein the second bandwidth field comprises information on a bandwidth at which the UL PPDU is received.

13. The wireless device of claim 12,
wherein the bandwidth at which the UL PPDU is received is 20 MHz,
wherein the first RU is determined based on a tone plan for the total bandwidth, and
wherein the second RU is determined based on a tone plan for the 20 MHz.

14. The wireless device of claim 11,
wherein the first user information field comprises information on whether the STA receives the DL PPDU, and
wherein the second user information field comprises information on whether the STA transmits the UL PPDU.

15. The wireless device of claim 10,
wherein information on the total bandwidth consists of 2 bits, and
wherein the total bandwidth is determined to be any one of 20 MHz, 40 MHz, 80 MHz, or 160(80+80)MHz, based on the 2 bits.

16. The wireless device of claim 10,
wherein the trigger type field comprises FDR indication information on that the STA can perform the FDR, and
wherein the FDR indication information is comprised in a reserved bit of the trigger type field.

17. The wireless device of claim 12,
wherein the DL PPDU is generated by using a high efficiency multi user PPDU (HE MU PPDU),
wherein the UL PPDU is generated by using a high efficiency trigger-based PPDU (HE TB PPDU),
wherein the first signal field is related to an HE-SIG-A field of the HE MU PPDU, and
wherein the second signal field is related to an HE-SIG-A field of the HE TB PPDU.

18. A method of transmitting and receiving a physical layer protocol data unit (PPDU), based on full-duplex radio (FDR), in a wireless local area network (WLAN) system, the method comprising:
receiving, by a station (STA), a trigger frame from an access point (AP);
receiving, by the STA, a downlink (DL) PPDU from the AP, based on the trigger frame; and
transmitting, by the STA, an uplink (UL) PPDU to the AP, based on the trigger frame,
wherein the trigger frame comprises a first common information field, wherein the first common information field comprises a trigger type field, a length field, a bandwidth field and a preamble puncturing field, wherein the bandwidth field comprises first information on a total bandwidth for the DL and UL PPDUs, wherein the preamble puncturing field comprises second information on a puncturing pattern for the total bandwidth, wherein the second information comprises information on that a primary 20 MHz channel of the total bandwidth is punctured, wherein the UL PPDU is transmitted through the primary 20 MHz channel based on the second information, wherein the DL PPDU and the UL PPDU are based on the FDR, wherein a start time of the UL PPDU and a start time of the DL PPDU have a delay of a specific time, wherein the specific time is set to a time immediately after a Legacy-Short Training Field (L-STF) of the DL PPDU is received, wherein the length field comprises information on a maximum value among first and second lengths, wherein the first length is a length of the DL PPDU, and wherein the second length is a sum of a length of the UL PPDU and a length of the specific time.

\* \* \* \* \*